US012727003B2

(12) United States Patent
Chen et al.

(10) Patent No.: US 12,727,003 B2
(45) Date of Patent: Sep. 1, 2026

(54) DATA TRANSMISSION METHOD AND APPARATUS

(71) Applicant: Huawei Technologies Co., Ltd., Shenzhen (CN)

(72) Inventors: Ying Chen, Hangzhou (CN); Ruonan Yang, Hangzhou (CN); Yinggang Du, Shenzhen (CN); Jun Wang, Hangzhou (CN); Yunfei Qiao, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 371 days.

(21) Appl. No.: 18/505,623

(22) Filed: Nov. 9, 2023

(65) Prior Publication Data

US 2024/0073927 A1 Feb. 29, 2024

Related U.S. Application Data

(63) Continuation of application No. PCT/CN2022/086362, filed on Apr. 12, 2022.

(30) Foreign Application Priority Data

May 10, 2021 (CN) ........................ 202110506524.8

(51) Int. Cl.

| | |
|---|---|
| ***H04W 72/232*** | (2023.01) |
| ***H04W 72/0446*** | (2023.01) |
| ***H04W 72/1268*** | (2023.01) |
| *H04L 5/00* | (2006.01) |
| *H04W 52/02* | (2009.01) |

(52) U.S. Cl.

CPC ..... *H04W 72/232* (2023.01); *H04W 72/0446* (2013.01); *H04W 72/1268* (2013.01); *H04L 5/0053* (2013.01); *H04W 52/0216* (2013.01)

(58) Field of Classification Search

CPC ........... H04W 72/232; H04W 72/0446; H04W 72/1268; H04W 56/0045; H04W 52/0216; H04W 52/0229; H04W 52/0248; H04W 52/028; H04B 7/18513; H04B 7/1851; H04L 5/0053

See application file for complete search history.

(56) References Cited

U.S. PATENT DOCUMENTS

2017/0359746 A1* 12/2017 Lee ...................... H04B 7/0626
2018/0054792 A1* 2/2018 Lee ........................ H04B 17/24
2020/0314811 A1* 10/2020 Lin .................. H04W 52/0216

(Continued)

FOREIGN PATENT DOCUMENTS

CN 110719635 A 1/2020
CN 110719645 A 1/2020

(Continued)

*Primary Examiner* — Mounir Moutaouakil
(74) *Attorney, Agent, or Firm* — Slater Matsil, LLP

(57) ABSTRACT

This application provides a data transmission method. The method includes: receiving a first PDCCH, where the first PDCCH includes first DCI, the first DCI indicates a first resource, and the first resource is used to carry first uplink data; determining a first time period or a second time period, where the first time period includes a time period for monitoring a second PDCCH, and the second time period does not include the second PDCCH; and monitoring the second PDCCH based on the first time period or the second time period.

20 Claims, 12 Drawing Sheets

(56) References Cited

U.S. PATENT DOCUMENTS

| | | | | |
|---|---|---|---|---|
| 2022/0150932 | A1* | 5/2022 | Luo | H04W 72/0446 |
| 2023/0247617 | A1* | 8/2023 | Matsumura | H04L 5/0051<br>370/329 |
| 2023/0292312 | A1* | 9/2023 | Khoshnevisan | H04L 1/1887 |
| 2023/0362943 | A1* | 11/2023 | Sun | H04W 72/23 |
| 2024/0040582 | A1* | 2/2024 | He | H04L 1/1854 |
| 2024/0048320 | A1* | 2/2024 | Sun | H04L 5/0051 |

FOREIGN PATENT DOCUMENTS

| | | | |
|---|---|---|---|
| CN | 112312523 | A | 2/2021 |
| EP | 3772197 | A1 | 2/2021 |
| WO | 2021016818 | A1 | 2/2021 |

* cited by examiner (a)

(b)

DATA TRANSMISSION METHOD AND APPARATUS

CROSS-REFERENCE TO RELATED APPLICATIONS

This application is a continuation of International Patent Application No. PCT/CN2022/086362, filed on Apr. 12, 2022, which claims priority to Chinese Patent Application No. 202110506524.8, filed on May 10, 2021. The disclosures of the aforementioned applications are hereby incorporated by reference in their entireties.

TECHNICAL FIELD

This application relates to the communication field, and more specifically, to a data transmission method and an apparatus.

BACKGROUND

In a satellite communication system, an altitude difference between a network device (for example, a satellite) and a terminal device in a non-terrestrial network (NTN) is large (which is generally greater than 500 km). Therefore, in the satellite communication, a round-trip delay and a round-trip delay difference of a terminal device in a same beam/cell are far greater than a round-trip delay and a round-trip delay difference of UE in a same cell on ground. For example, when a diameter of a cell in a terrestrial cellular network is 350 km, a maximum round-trip delay in the cell is 1.17 milliseconds (ms). However, when a satellite orbit height is 600 km and a beam diameter is 350 km, a maximum round-trip delay may reach about 13 ms (a communication elevation angle of the terminal device is 10°).

To facilitate an operation of the network device, timing of an uplink signal needs to be aligned with timing of a corresponding downlink signal when the uplink signal arrives at the network device. Therefore, when sending the uplink signal, different terminal devices need to perform different timing advance (TA) adjustment based on round-trip delays with the network device, so that all users simultaneously arrive at the network device. For example, the terminal device receives physical downlink shared channel (PDSCH) data in a slot n, and the terminal device needs to feed back an acknowledgment character (ACK) or a negative acknowledgment character (NACK) in a slot (n+K). Due to a requirement of a TA, the terminal device needs to send the ACK in a slot (n+K−TA). A unit of the TA needs to be converted to be the same as that of K. Therefore, a maximum value of the TA is less than K. Currently, a maximum value of K is 15. When a subcarrier spacing (SCS) is 30 kHz, a slot length is 0.5 ms, and a maximum TA is 7.5 ms. In addition, because a round-trip delay in the NTN network may reach several hundreds ms, the current maximum TA value cannot meet a timing advance requirement of the terminal device in the NTN network. Therefore, a K offset value (which may also be referred to as a Koffset value) is introduced. In other words, the network device schedules a corresponding ACK to be transmitted in a slot (n+K+Koffset), that is, a network side receives the ACK in the slot (n+K+Koffset), and the terminal device needs to perform TA adjustment to send the ACK. A value of Koffset needs to ensure that K+Koffset can cover a maximum TA of the terminal device. However, it also means that the network device may send downlink control information between n and n+K+Koffset. This greatly increases duration for the terminal device to monitor a PDCCH (physical downlink control channel), and increases power consumption of the terminal device. If the terminal device is an internet of things (IoT) device, the IoT device is more sensitive to power consumption. Therefore, how to reduce duration for the terminal device to monitor downlink control information (DCI) in the satellite communication system becomes an urgent problem to be resolved.

SUMMARY

This application provides a data transmission method and an apparatus, so that a manner in which a terminal device in a satellite communication system monitors DCI is more flexible, and long duration for the terminal device to monitor the DCI caused by an excessively long round-trip delay is reduced, thereby reducing power consumption of the terminal device.

According to a first aspect, a data transmission method is provided, where the method includes: receiving a first physical downlink control channel PDCCH, where the first PDCCH includes first downlink control information DCI, the first DCI indicates a first resource, and the first resource is used to carry first uplink data; determining a first time period or a second time period, where the first time period includes a time period for monitoring a second PDCCH, and the second time period does not include the second PDCCH; and monitoring the second PDCCH based on the first time period or the second time period.

In a possible implementation, the first uplink data is sent on the first resource.

It should be noted that the first aspect and implementations of the first aspect may be executed by a terminal device, that is, receiving the first PDCCH, sending the first uplink data, and determining the first time period or the second time period are all based on a perspective of a terminal device side.

That the first time period includes the time period for monitoring the second PDCCH may be understood as that the terminal device monitors the second PDCCH in the first time period. That the second time period does not include the second PDCCH may be understood as that the terminal device does not monitor the second PDCCH in the second time period.

In the foregoing manner, the terminal device is enabled to monitor the second PDCCH in the first time period, and not monitor the second PDCCH in the second time period. This avoids a case that the terminal device monitors a PDCCH for a long time, and reduces power consumption of the terminal device. Especially in a satellite communication system, due to an excessively long round-trip delay, duration for the terminal device to monitor the PDCCH is long.

In a possible implementation, the second PDCCH includes second DCI, the second DCI indicates a second resource, and the second resource is used to carry second uplink data.

In a possible implementation, the second uplink data is sent on the second resource.

For example, the second DCI may include a new data indicator (NDI), that is, indicates whether the second uplink data is new data to be transmitted or retransmitted data of the first uplink data.

In a possible implementation, the determining a first time period or a second time period includes: determining the first time period or the second time period based on a size of a first time interval, where the first time interval includes a time interval between an end moment at which the first PDCCH is received and a start moment corresponding to the first resource.

It should be noted that it may be understood from a perspective of the terminal device herein. For example, the first time interval includes a time interval between an end moment at which the terminal device receives the first PDCCH and a start moment corresponding to the first resource (that is, sending the first uplink data). For another implementation of the first aspect, refer to the description herein.

In the foregoing manner, the terminal device is enabled to flexibly select the first time period or the second time period, so as to flexibly monitor the second PDCCH.

In a possible implementation, the determining the first time period or the second time period based on a size of a first time interval includes:

determining the first time period or the second time period based on at least one of a first size relationship and a second size relationship, where the first size relationship is a size relationship between the size of the first time interval and a first threshold, the second size relationship is a size relationship between the size of the first time interval and a second threshold, and the second threshold is greater than the first threshold.

For example, the first threshold or the second threshold is predefined, or the first threshold or the second threshold is associated with duration corresponding to the first resource, or the first threshold or the second threshold is associated with a quantity of times of repeated transmission of the first uplink data.

In a possible implementation, the first time period and the second time period may be further determined.

In a possible implementation, the determining the first time period or the second time period based on at least one of a first size relationship and a second size relationship includes: if the first time interval is less than or equal to the first threshold, determining that the second time period includes a time period from the end moment of the first PDCCH to the start moment corresponding to the first resource.

In the foregoing manner, when a time interval between receiving the first DCI and sending the first uplink data is small, the terminal device may not monitor the second DCI within the time interval, that is, a network device does not schedule the second PDCCH within the time. This can reduce a time for the terminal device to monitor DCI, and reduce power consumption.

In a possible implementation, the determining the first time period or the second time period based on at least one of a first size relationship and a second size relationship includes: if the first time interval is less than or equal to the first threshold, determining that the first time period includes a time period from the end moment of the first PDCCH to the start moment corresponding to the first resource.

In the foregoing manner, when a time interval between receiving the first DCI and sending the first uplink data is small, it may be specified that the terminal device needs to monitor the second DCI only within the time interval, that is, the network device schedules the second PDCCH within the time, and does not schedule the second PDCCH in another time period. The foregoing manner avoids useless monitoring performed by the terminal device within another time interval.

In a possible implementation, the determining the first time period or the second time period based on at least one of a first size relationship and a second size relationship includes: if the first time interval is greater than the first threshold and less than or equal to the second threshold, determining that the first time period includes a time period from the end moment of the first PDCCH to a start moment of a previous transmission time unit of the start moment corresponding to the first resource.

For example, a transmission time unit may be another unit such as a slot, a subframe, or a millisecond.

In the foregoing manner, the terminal device needs to monitor the second DCI only within the time period, that is, the network device schedules the second PDCCH within the time period, and does not schedule the second PDCCH in another time period. The foregoing manner avoids useless monitoring performed by the terminal device within another time interval.

In a possible implementation, the determining the first time period or the second time period based on at least one of a first size relationship and a second size relationship includes: if the first time interval is greater than the second threshold, determining that the first time period includes a time period from the end moment of the first PDCCH to a start moment of a previous transmission time unit that is earlier than the start moment corresponding to the first resource.

In the foregoing manner, the terminal device needs to monitor the second DCI only within the time period, that is, the network device schedules the second PDCCH within the time period, and does not schedule the second PDCCH in another time period. The foregoing manner avoids useless monitoring performed by the terminal device within another time interval.

In a possible implementation, the method further includes: if the second DCI is received in the first time period, determining that the second time period includes a time period from an end moment of the second PDCCH to the start moment corresponding to the first resource.

In the foregoing manner, if the terminal device receives the second DCI in the first time period, the terminal device does not need to monitor the second DCI after receiving the second DCI and before sending the first uplink data. The foregoing manner avoids useless monitoring performed by the terminal device within another time interval.

In a possible implementation, the method further includes: if the second DCI is not received in the first time period, determining that the second time period includes a time period from an end moment of the first time period to the start moment corresponding to the first resource.

In the foregoing manner, if the terminal device does not receive the second DCI in the first time period, the terminal device does not need to monitor the second DCI from the end moment of the first time period to the start moment at which the first uplink data is sent, and the network device does not schedule the second DCI within the time period. The foregoing manner avoids useless monitoring performed by the terminal device within another time interval.

In a possible implementation, the determining the first time period or the second time period based on at least one of a first size relationship and a second size relationship includes: if the first time interval is greater than the second threshold, determining that the second time period includes a time period from the end moment of the first PDCCH to a start moment of a previous transmission time unit that is earlier than the start moment corresponding to the first resource, and the first time period includes a time period from an end moment of the second time period to the start moment of the previous transmission time unit of the start moment corresponding to the first resource.

In the foregoing manner, when the first time interval is large, the terminal device may monitor the second DCI only in a period of time from the end moment at which the first DCI is received and the start moment at which the first uplink data is sent, and does not monitor the second DCI within another time interval. The foregoing manner avoids useless monitoring performed by the terminal device within another time interval.

In a possible implementation, the first time period includes a time period from a moment that is later than or equal to an end moment corresponding to the first resource to a moment that is delayed by a first time amount from the end moment corresponding to the first resource, and the first time amount is greater than or equal to 0.

For example, the first time amount is predefined, or the first time amount is associated with duration corresponding to the first resource, or the first time amount is associated with a quantity of times of repeated transmission of the first uplink data.

In the foregoing manner, a time at which the terminal device starts to monitor the second DCI (or may be referred to as monitoring the second PDCCH) may be the end moment corresponding to the first resource, or may be later than the end moment corresponding to the first resource. An end time at which the second DCI is monitored may be the moment that is delayed by the first time amount from the end moment corresponding to the first resource. The foregoing manner avoids useless monitoring performed by the terminal device within another time interval.

In a possible implementation, the second time period includes a time period from an end moment of the first time period to a moment that is a first delay later than the end moment corresponding to the first resource, and the first delay is a round-trip delay between a first communication apparatus and a second communication apparatus.

In the foregoing manner, because the round-trip delay in the satellite communication system is excessively long, if the terminal device always performs monitoring in the round-trip delay between sending the first uplink data and receiving feedback DCI (for example, an NDI) of the first uplink data, power consumption is high. Therefore, in the foregoing manner, the terminal device is enabled to monitor or not monitor the DCI only in a period of time, thereby avoiding useless monitoring performed by the terminal device within another time interval.

In a possible implementation, the second time period includes a time period from a moment that is later than or equal to an end moment corresponding to the first resource to a moment that is delayed by a second time amount from the end moment corresponding to the first resource, and the second time amount is greater than or equal to 0.

For example, the second time amount is predefined, or the second time amount is associated with duration corresponding to the first resource, or the second time amount is associated with a quantity of times of repeated transmission of the first uplink data.

In the foregoing manner, a time at which the terminal device starts to monitor the second DCI (or may be referred to as monitoring the second PDCCH) may be the end moment corresponding to the first resource, or may be later than the end moment corresponding to the first resource. An end time at which the second DCI is monitored may be the moment that is delayed by the second time amount from the end moment corresponding to the first resource. The foregoing manner avoids useless monitoring performed by the terminal device within another time interval.

In a possible implementation, the first time period includes a time period from an end moment of the second time period to a moment that is a first delay later than the end moment corresponding to the first resource, and the first delay is a round-trip delay between a first communication apparatus and a second communication apparatus.

In the foregoing manner, because the round-trip delay in the satellite communication system is excessively long, if the terminal device always performs monitoring in the round-trip delay between sending the first uplink data and receiving feedback DCI (for example, an NDI) of the first uplink data, power consumption is high. Therefore, in the foregoing manner, the terminal device is enabled to monitor or not monitor the DCI only in a period of time, thereby avoiding useless monitoring performed by the terminal device within another time interval.

In a possible implementation, before the first time period or the second time period is determined, a third PDCCH is received, the third PDCCH includes third DCI, the third DCI indicates a third resource, the third resource is used to carry third uplink data, and the determining a first time period or a second time period includes:

determining the first time period or the second time period based on a size of a second time interval, where the second time interval includes a time interval between an end moment corresponding to the first resource to a start moment corresponding to the third resource.

For example, the second DCI may include a new data indicator (NDI), that is, indicates whether the third uplink data is new data to be transmitted or retransmitted data of the first uplink data.

In a possible implementation, the determining the first time period or the second time period based on a size of a second time interval includes: determining the first time period or the second time period based on a third size relationship, where the third size relationship is a size relationship between the size of the second time interval and a third threshold, and the third threshold is greater than 0.

For example, the third threshold is predefined, or the third threshold is associated with duration corresponding to the first resource, or the third threshold is associated with a quantity of times of repeated transmission of the first uplink data.

In a possible implementation, the determining the first time period or the second time period based on a third size relationship includes: if the second time interval is less than or equal to the third threshold, determining that the first time period includes a time period from a moment that is a second delay later than an end moment corresponding to the third resource to a start moment of the second PDCCH, where the second delay is a sum of a third time amount and a first delay, the first delay is a round-trip delay between a first communication apparatus and a second communication apparatus, and the third time amount is greater than or equal to 0.

For example, the third time amount is predefined, or the third time amount is associated with duration corresponding to the first resource, or the third time amount is associated with a quantity of times of repeated transmission of the first uplink data.

In the foregoing manner, the first communication apparatus may be a terminal device such as an IoT device or a handheld terminal device, and the second communication apparatus may be a network device such as a satellite. When the second time interval is small, the terminal device only needs to monitor DCI in a period of time after sending the third uplink data, thereby avoiding useless monitoring performed by the terminal device within another time interval.

In a possible implementation, the determining the first time period or the second time period based on a third size relationship includes: if the second time interval is greater than the third threshold, determining that the first time period includes a time period from a moment that is a first delay later than the end moment corresponding to the first resource to a start moment of the second PDCCH, where the first delay is a round-trip delay between a first communication apparatus and a second communication apparatus.

In the foregoing manner, when the second time interval is large, the satellite may send the second DCI after receiving the first uplink data. Therefore, the terminal device may monitor the second DCI after sending the first uplink data and after the round-trip delay, or may start to monitor the second DCI after a specific time is delayed according to regulations, thereby avoiding useless monitoring performed by the terminal device within another time interval.

In a possible implementation, the determining the first time period or the second time period based on a third size relationship includes: if the second time interval is greater than the third threshold, determining that the first time period includes a time period from a moment that is a first delay later than the end moment corresponding to the first resource to a moment that is the first delay later than an end moment corresponding to the third resource, where the first delay is a round-trip delay between a first communication apparatus and a second communication apparatus.

In a possible implementation, the method includes: if the second DCI is received in the first time period, determining that the second time period includes a time period from an end moment of the second PDCCH to the moment that is the first delay later than the end moment corresponding to the third resource.

In the foregoing manner, after receiving the second DCI in the first time period, the terminal device may stop monitoring, to reduce power consumption.

In a possible implementation, before the first time period or the second time period is determined, the first uplink data is sent on a fourth resource, a start moment corresponding to the fourth resource is earlier than a start moment corresponding to the first resource by a fourth time amount, and the determining a first time period or a second time period includes: determining the second time period based on a size relationship between a size of the fourth time amount and a fourth threshold.

For example, the fourth time amount is predefined, or the fourth time amount is associated with duration corresponding to the first resource, or the fourth time amount is associated with a quantity of times of repeated transmission of the first uplink data.

In a possible implementation, an end moment corresponding to the fourth resource is an end moment of an uplink subframe n, and the determining the second time period based on a size relationship between a size of the fourth time amount and a fourth threshold includes: if the fourth time amount is greater than the fourth threshold, determining that the second time period includes a time period from a start moment of a downlink subframe (n+1) to an end moment of a downlink subframe (n+3+Kmac), where Kmac is an offset between boundaries of uplink and downlink frames of a second communication apparatus.

In the foregoing manner, an amount of timing advance performed by the terminal device cannot align boundaries of uplink and downlink subframes of the network device, and the network device delays Kmac subframes to receive the first uplink data. Therefore, the terminal device may delay a time of Kmac to monitor the DCI, thereby reducing power consumption of the terminal device.

In a possible implementation, the first time period includes a time period from a moment that is delayed by a fifth time amount from a start moment corresponding to the first resource to a start moment of the second PDCCH, and the fifth time amount is greater than or equal to 0.

For example, the fifth time amount is predefined, or the fifth time amount is associated with duration corresponding to the first resource, or the fifth time amount is associated with a quantity of times of repeated transmission of the first uplink data.

In the foregoing manner, it is directly specified that the terminal device monitors the second DCI within a fixed time, so as to further reduce power consumption of the terminal device.

In a possible implementation, the first time period includes a time period from a moment that is a third delay later than an end moment corresponding to the first resource to a start moment of the second PDCCH, the third delay is a sum of a sixth time amount and a first delay, and the first delay is a round-trip delay between a first communication apparatus and a second communication apparatus.

In the foregoing manner, it is directly specified that the terminal device monitors the second DCI within a fixed time, so as to further reduce power consumption of the terminal device.

In a possible implementation, a start moment and an end moment of the first time period or the second time period are predefined, and a time interval between the end moment of the first PDCCH and the start moment of the second PDCCH is predefined.

In the foregoing manner, it is directly specified that the terminal device monitors the second DCI within a fixed time, so as to further reduce power consumption of the terminal device. For example, it may be agreed that after receiving two ACKs/NACKs, the network device delivers two PDCCHs at specified time points, including start time of the two PDCCHs and an interval between the two PDCCHs. The terminal device monitors the PDCCH within a corresponding time according to regulations, so that duration for monitoring the PDCCH can be further reduced.

According to a second aspect, a data transmission method is provided, where the method includes: sending a first physical downlink control channel PDCCH, where the first PDCCH includes first downlink control information DCI, the first DCI indicates a first resource, and the first resource is used to carry first uplink data; determining a first time period or a second time period, where the first time period includes a time period for sending a second PDCCH, and the second time period does not include the second PDCCH; and sending the second PDCCH based on the first time period or the second time period.

In a possible implementation, the first uplink data is received on the first resource.

It should be noted that the second aspect and implementations of the second aspect may be executed by a network device (for example, a satellite), that is, sending the first PDCCH, receiving the first uplink data, and determining the first time period or the second time period are all based on a perspective of a network device side, and there are some differences from the perspective of the terminal device side. For example, a start moment at which the terminal device receives the first PDCCH is a moment that is after a start moment at which the network device sends the first PDCCH and after a transmission delay, or a ½ RTT. For another example, the terminal device has passed an RTT from an end moment at which the first uplink data is sent to a start moment at which feedback DCI (for example, an NDI) of the first uplink data is received. However, on the network device side, the network device may send the feedback DCI (for example, the NDI) of the first uplink data after the end moment at which the first uplink data is received. For other differences, refer to the foregoing descriptions, and details are not described herein again.

That the first time period includes the time period for sending the second PDCCH may be understood as that the network device sends (schedules) the second PDCCH in the first time period. That the second time period does not include the second PDCCH may be understood as that the network device does not send (schedule) the second PDCCH in the second time period.

In the foregoing manner, the terminal device is enabled to monitor the second PDCCH in the first time period, and not monitor the second PDCCH in the second time period. This avoids a case that the terminal device monitors a PDCCH for a long time, and reduces power consumption of the terminal device. Especially in a satellite communication system, due to an excessively long round-trip delay, duration for the terminal device to monitor the PDCCH is long.

In a possible implementation, the second PDCCH includes second DCI, the second DCI indicates a second resource, and the second resource is used to carry second uplink data.

In a possible implementation, the second uplink data is received on the second resource.

For example, the second DCI may include a new data indicator (NDI), that is, indicates whether the second uplink data is new data to be transmitted or retransmitted data of the first uplink data.

In a possible implementation, the determining a first time period or a second time period includes: determining the first time period or the second time period based on a size of a first time interval, where the first time interval includes a time interval between an end moment of the first PDCCH and a start moment corresponding to the first resource.

It should be noted that it may be understood from a perspective of the network device herein. For example, the first time interval includes a time interval between an end moment at which the network device sends the first PDCCH and a start moment corresponding to the first resource (that is, receiving the first uplink data). For another implementation of the second aspect, refer to the description herein.

In the foregoing manner, the terminal device is enabled to flexibly select the first time period or the second time period, so as to flexibly monitor the second PDCCH.

In a possible implementation, the determining the first time period or the second time period based on a size of a first time interval includes: determining the first time period or the second time period based on at least one of a first size relationship and a second size relationship, where the first size relationship is a size relationship between the size of the first time interval and a first threshold, the second size relationship is a size relationship between the size of the first time interval and a second threshold, and the second threshold is greater than the first threshold.

For example, the first threshold or the second threshold is predefined, or the first threshold or the second threshold is associated with duration corresponding to the first resource, or the first threshold or the second threshold is associated with a quantity of times of repeated transmission of the first uplink data.

In a possible implementation, the first time period and the second time period may be further determined.

In a possible implementation, the determining the first time period or the second time period based on at least one of a first size relationship and a second size relationship includes: if the first time interval is less than or equal to the first threshold, determining that the second time period includes a time period from the end moment of the first PDCCH to the start moment corresponding to the first resource.

In the foregoing manner, when a time interval between sending the first DCI and receiving the first uplink data is small, the terminal device may not monitor the second DCI within the time interval, that is, the network device does not schedule the second PDCCH within the time. This can reduce a time for the terminal device to monitor DCI, and reduce power consumption.

In a possible implementation, the determining the first time period or the second time period based on at least one of a first size relationship and a second size relationship includes: if the first time interval is less than or equal to the first threshold, determining that the first time period includes a time period from the end moment of the first PDCCH to the start moment corresponding to the first resource.

In the foregoing manner, when a time interval between sending the first DCI and receiving the first uplink data is small, it may be specified that the terminal device needs to monitor the second DCI only within the time interval, that is, the network device schedules the second PDCCH within the time, and does not schedule the second PDCCH in another time period. The foregoing manner avoids useless monitoring performed by the terminal device within another time interval.

In a possible implementation, the determining the first time period or the second time period based on at least one of a first size relationship and a second size relationship includes: if the first time interval is greater than the first threshold and less than or equal to the second threshold, determining that the first time period includes a time period from the end moment of the first PDCCH to a start moment of a previous transmission time unit of the start moment corresponding to the first resource.

For example, a transmission time unit may be another unit such as a slot, a subframe, or a millisecond.

In the foregoing manner, the terminal device needs to monitor the second DCI only within the time period, that is, the network device schedules the second PDCCH within the time period, and does not schedule the second PDCCH in another time period. The foregoing manner avoids useless monitoring performed by the terminal device within another time interval.

In a possible implementation, the determining the first time period or the second time period based on at least one of a first size relationship and a second size relationship includes:

if the first time interval is greater than the second threshold, determining that the first time period includes a time period from the end moment of the first PDCCH to a start moment of a previous transmission time unit that is earlier than the start moment corresponding to the first resource.

In the foregoing manner, the terminal device needs to monitor the second DCI only within the time period, that is, the network device schedules the second PDCCH within the time period, and does not schedule the second PDCCH in another time period. The foregoing manner avoids useless monitoring performed by the terminal device within another time interval.

In a possible implementation, the method further includes: if the second DCI is sent in the first time period, determining that the second time period includes a time period from an end moment of the second PDCCH to the start moment corresponding to the first resource.

In the foregoing manner, if the network device sends the second DCI in the first time period, it also means that the terminal device receives the second DCI in the first time period. In this case, the terminal device does not need to monitor the second DCI after receiving the second DCI and before sending the first uplink data. The foregoing manner avoids useless monitoring performed by the terminal device within another time interval.

In a possible implementation, the determining the first time period or the second time period based on at least one of a first size relationship and a second size relationship includes: if the first time interval is greater than the second threshold, determining that the second time period includes a time period from the end moment of the first PDCCH to a start moment of a previous transmission time unit that is earlier than the start moment corresponding to the first resource, and the first time period includes a time period from an end moment of the second time period to the start moment of the previous transmission time unit of the start moment corresponding to the first resource.

In the foregoing manner, when the first time interval is large, the terminal device may monitor the second DCI only in a period of time from the end moment at which the first DCI is received and the start moment at which the first uplink data is sent, and does not monitor the second DCI within another time interval. The foregoing manner avoids useless monitoring performed by the terminal device within another time interval.

In a possible implementation, the first time period includes a time period from a moment that is later than or equal to an end moment of the first PDCCH to a moment that is delayed by a first time amount from the end moment of the first PDCCH, and the first time amount is greater than or equal to 0.

For example, the first time amount is predefined, or the first time amount is associated with duration corresponding to the first resource, or the first time amount is associated with a quantity of times of repeated transmission of the first uplink data.

In the foregoing manner, a time at which the terminal device starts to monitor the second DCI (or may be referred to as monitoring the second PDCCH) may be the end moment corresponding to the first resource, or may be later than the end moment corresponding to the first resource. An end time at which the second DCI is monitored may be the moment that is delayed by the first time amount from the end moment corresponding to the first resource. The foregoing manner avoids useless monitoring performed by the terminal device within another time interval.

In a possible implementation, the second time period includes a time period from an end moment of the first time period to the start moment corresponding to the first resource.

In the foregoing manner, because the round-trip delay in the satellite communication system is excessively long, if the terminal device always performs monitoring in the round-trip delay between sending the first uplink data and receiving feedback DCI (for example, an NDI) of the first uplink data, power consumption is high. Therefore, in the foregoing manner, the terminal device is enabled to monitor or not monitor the DCI only in a period of time, thereby avoiding useless monitoring performed by the terminal device within another time interval.

In a possible implementation, the second time period includes a time period from a moment that is later than or equal to an end moment of the first PDCCH to a moment that is delayed by a second time amount from the end moment of the first PDCCH, and the second time amount is greater than or equal to 0.

For example, the second time amount is predefined, or the second time amount is associated with duration corresponding to the first resource, or the second time amount is associated with a quantity of times of repeated transmission of the first uplink data.

In the foregoing manner, a time at which the network device starts to send the second DCI (or may be referred to as scheduling the second PDCCH) may be the end moment corresponding to the first resource, or may be later than the end moment corresponding to the first resource, or may be the moment that is delayed by the second time amount from the end moment corresponding to the first resource. The foregoing manner avoids useless monitoring performed by the terminal device within another time interval.

In a possible implementation, the first time period includes a time period from an end moment of the second time period to a moment that is a first delay later than the start moment corresponding to the first resource, and the first delay is a round-trip delay between a first communication apparatus and a second communication apparatus.

In the foregoing manner, because the round-trip delay in the satellite communication system is excessively long, if the terminal device always performs monitoring in the round-trip delay between sending the first uplink data and receiving feedback DCI (for example, an NDI) of the first uplink data, power consumption is high. Therefore, in the foregoing manner, the terminal device is enabled to monitor or not monitor the DCI only in a period of time, thereby avoiding useless monitoring performed by the terminal device within another time interval.

In a possible implementation, before the first time period or the second time period is determined, a third PDCCH is received, the third PDCCH includes third DCI, the third DCI indicates a third resource, the third resource is used to carry third uplink data, and the determining a first time period or a second time period includes: determining the first time period or the second time period based on a size of a second time interval, where the second time interval includes a time interval between an end moment corresponding to the first resource to a start moment corresponding to the third resource.

For example, the second DCI may include a new data indicator (NDI), that is, indicates whether the third uplink data is new data to be transmitted or retransmitted data of the first uplink data.

In a possible implementation, the determining the first time period or the second time period based on a size of a second time interval includes: determining the first time period or the second time period based on a third size relationship, where the third size relationship is a size relationship between the size of the second time interval and a third threshold, and the third threshold is greater than 0.

For example, the third threshold is predefined, or the third threshold is associated with duration corresponding to the first resource, or the third threshold is associated with a quantity of times of repeated transmission of the first uplink data.

In a possible implementation, the determining the first time period or the second time period based on a third size relationship includes: if the second time interval is less than or equal to the third threshold, determining that the first time period includes a time period from a moment that is after an end moment corresponding to the third resource and after a second delay third time amount to a start moment of the second PDCCH, where the second delay is a sum of a third time amount and a first delay, the first delay is a round-trip delay between a first communication apparatus and a second communication apparatus, and the third time amount is greater than or equal to 0.

For example, the third time amount is predefined, or the third time amount is associated with duration corresponding to the first resource, or the third time amount is associated with a quantity of times of repeated transmission of the first uplink data.

In the foregoing manner, the first communication apparatus may be a terminal device such as an IoT device or a handheld terminal device, and the second communication apparatus may be a network device such as a satellite. When the second time interval is small, the terminal device only needs to monitor DCI in a period of time after sending the third uplink data, thereby avoiding useless monitoring performed by the terminal device within another time interval.

In a possible implementation, the determining the first time period or the second time period based on a third size relationship includes: if the second time interval is greater than the third threshold, determining that the first time period includes a time period from the end moment corresponding to the first resource to the start moment of the second PDCCH.

In the foregoing manner, when the second time interval is large, the satellite may send the second DCI after receiving the first uplink data. Therefore, the terminal device may monitor the second DCI after sending the first uplink data and after the round-trip delay, or may start to monitor the second DCI after a specific time is delayed according to regulations, thereby avoiding useless monitoring performed by the terminal device within another time interval.

In a possible implementation, the determining the first time period or the second time period based on a third size relationship includes: if the second time interval is greater than the third threshold, the first time period includes a time period from the end moment corresponding to the first resource to the end moment corresponding to the third resource.

In a possible implementation, the method further includes: if the second PDCCH is sent in the first time period, determining that the second time period includes a time period from an end moment of the second PDCCH to the end moment corresponding to the third resource.

In the foregoing manner, after receiving the second DCI in the first time period, the terminal device may stop monitoring, to reduce power consumption.

In a possible implementation, before the first time period or the second time period is determined, the first uplink data is received on a fourth resource, where a start moment corresponding to the fourth resource is offset by Kmac subframes relative to a start moment corresponding to the first resource, Kmac is greater than or equal to 0, and the determining a first time period or a second time period includes:

determining the second time period based on a size relationship between a size of Kmac and a fourth threshold.

For example, the fourth time amount is predefined, or the fourth time amount is associated with duration corresponding to the first resource, or the fourth time amount is associated with a quantity of times of repeated transmission of the first uplink data.

In a possible implementation, an end moment corresponding to the fourth resource is an end moment of an uplink subframe n, and the determining the second time period based on a size relationship between a size of Kmac and a fourth threshold includes: if the size of Kmac is greater than the fourth threshold, determining that the second time period includes a time period from a start moment of a downlink subframe (n+1) to an end moment of a downlink subframe (n+3+Kmac).

In the foregoing manner, an amount of timing advance performed by the terminal device cannot align boundaries of uplink and downlink subframes of the network device, and the network device delays Kmac subframes to receive the first uplink data. Therefore, the terminal device may delay a time of Kmac to monitor the DCI, thereby reducing power consumption of the terminal device.

In a possible implementation, a start moment and an end moment of the first time period or the second time period are predefined, and a time interval between the end moment of the first PDCCH and the start moment of the second PDCCH is predefined.

In the foregoing manner, it is directly specified that the terminal device monitors the second DCI within a fixed time, so as to further reduce power consumption of the terminal device. For example, it may be agreed that after receiving two ACKs/NACKs, the network device delivers two PDCCHs at specified time points, including start time of the two PDCCHs and an interval between the two PDCCHs. The terminal device monitors the PDCCH within a corresponding time according to regulations, so that duration for monitoring the PDCCH can be further reduced.

According to a third aspect, a data transmission apparatus is provided, where the apparatus includes: a transceiver module, where the transceiver module is configured to receive a first physical downlink control channel PDCCH, where the first PDCCH includes first downlink control information DCI, the first DCI indicates a first resource, and the first resource is used to carry first uplink data; and a processing module, where the processing module is configured to determine a first time period or a second time period, where the first time period includes a time period for monitoring a second PDCCH, and the second time period does not include the second PDCCH; and the processing module is further configured to monitor the second PDCCH based on the first time period or the second time period.

In a possible implementation, the first uplink data is sent on the first resource.

It should be noted that the third aspect and implementations of the third aspect may be executed by a terminal device, that is, receiving the first PDCCH, sending the first uplink data, and determining the first time period or the second time period are all based on a perspective of a terminal device side.

That the first time period includes the time period for monitoring the second PDCCH may be understood as that the terminal device monitors the second PDCCH in the first time period. That the second time period does not include the second PDCCH may be understood as that the terminal device does not monitor the second PDCCH in the second time period.

In the foregoing manner, the terminal device is enabled to monitor the second PDCCH in the first time period, and not monitor the second PDCCH in the second time period. This avoids a case that the terminal device monitors a PDCCH for a long time, and reduces power consumption of the terminal device. Especially in a satellite communication system, due to an excessively long round-trip delay, duration for the terminal device to monitor the PDCCH is long.

In a possible implementation, the second PDCCH includes second DCI, the second DCI indicates a second resource, and the second resource is used to carry second uplink data.

In a possible implementation, the second uplink data is sent on the second resource.

For example, the second DCI may include a new data indicator (NDI), that is, indicates whether the second uplink data is new data to be transmitted or retransmitted data of the first uplink data.

In a possible implementation, the determining a first time period or a second time period includes: determining the first time period or the second time period based on a size of a first time interval, where the first time interval includes a time interval between an end moment at which the first PDCCH is received and a start moment corresponding to the first resource.

It should be noted that it may be understood from a perspective of the terminal device herein. For example, the first time interval includes a time interval between an end moment at which the terminal device receives the first PDCCH and a start moment corresponding to the first resource (that is, sending the first uplink data). For another implementation of the first aspect, refer to the description herein.

In the foregoing manner, the terminal device is enabled to flexibly select the first time period or the second time period, so as to flexibly monitor the second PDCCH.

In a possible implementation, the determining the first time period or the second time period based on a size of a first time interval includes:

determining the first time period or the second time period based on at least one of a first size relationship and a second size relationship, where the first size relationship is a size relationship between the size of the first time interval and a first threshold, the second size relationship is a size relationship between the size of the first time interval and a second threshold, and the second threshold is greater than the first threshold.

For example, the first threshold or the second threshold is predefined, or the first threshold or the second threshold is associated with duration corresponding to the first resource, or the first threshold or the second threshold is associated with a quantity of times of repeated transmission of the first uplink data.

In a possible implementation, the first time period and the second time period may be further determined.

In a possible implementation, the determining the first time period or the second time period based on at least one of a first size relationship and a second size relationship includes: if the first time interval is less than or equal to the first threshold, determining that the second time period includes a time period from the end moment of the first PDCCH to the start moment corresponding to the first resource.

In the foregoing manner, when a time interval between receiving the first DCI and sending the first uplink data is small, the terminal device may not monitor the second DCI within the time interval, that is, a network device does not schedule the second PDCCH within the time. This can reduce a time for the terminal device to monitor DCI, and reduce power consumption.

In a possible implementation, the determining the first time period or the second time period based on at least one of a first size relationship and a second size relationship includes: if the first time interval is less than or equal to the first threshold, determining that the first time period includes a time period from the end moment of the first PDCCH to the start moment corresponding to the first resource.

In the foregoing manner, when a time interval between receiving the first DCI and sending the first uplink data is small, it may be specified that the terminal device needs to monitor the second DCI only within the time interval, that is, the network device schedules the second PDCCH within the time, and does not schedule the second PDCCH in another time period. The foregoing manner avoids useless monitoring performed by the terminal device within another time interval.

In a possible implementation, the determining the first time period or the second time period based on at least one of a first size relationship and a second size relationship includes: if the first time interval is greater than the first threshold and less than or equal to the second threshold, determining that the first time period includes a time period from the end moment of the first PDCCH to a start moment of a previous transmission time unit of the start moment corresponding to the first resource.

For example, a transmission time unit may be another unit such as a slot, a subframe, or a millisecond.

In the foregoing manner, the terminal device needs to monitor the second DCI only within the time period, that is, the network device schedules the second PDCCH within the time period, and does not schedule the second PDCCH in another time period. The foregoing manner avoids useless monitoring performed by the terminal device within another time interval.

In a possible implementation, the determining the first time period or the second time period based on at least one of a first size relationship and a second size relationship includes: if the first time interval is greater than the second threshold, determining that the first time period includes a time period from the end moment of the first PDCCH to a start moment of a previous transmission time unit that is earlier than the start moment corresponding to the first resource.

In the foregoing manner, the terminal device needs to monitor the second DCI only within the time period, that is, the network device schedules the second PDCCH within the time period, and does not schedule the second PDCCH in another time period. The foregoing manner avoids useless monitoring performed by the terminal device within another time interval.

In a possible implementation, if the second DCI is received in the first time period, the second time period includes a time period from an end moment of the second PDCCH to the start moment corresponding to the first resource.

In the foregoing manner, if the terminal device receives the second DCI in the first time period, the terminal device does not need to monitor the second DCI after receiving the second DCI and before sending the first uplink data. The foregoing manner avoids useless monitoring performed by the terminal device within another time interval.

In a possible implementation, if the second DCI is not received in the first time period, the second time period includes a time period from an end moment of the first time period to the start moment corresponding to the first resource.

In the foregoing manner, if the terminal device does not receive the second DCI in the first time period, the terminal device does not need to monitor the second DCI from the end moment of the first time period to the start moment at which the first uplink data is sent, and the network device does not schedule the second DCI within the time period. The foregoing manner avoids useless monitoring performed by the terminal device within another time interval.

In a possible implementation, the determining the first time period or the second time period based on at least one of a first size relationship and a second size relationship includes: if the first time interval is greater than the second threshold, determining that the second time period includes a time period from the end moment of the first PDCCH to a start moment of a previous transmission time unit that is earlier than the start moment corresponding to the first resource, and the first time period includes a time period from an end moment of the second time period to the start moment of the previous transmission time unit of the start moment corresponding to the first resource.

In the foregoing manner, when the first time interval is large, the terminal device may monitor the second DCI only in a period of time from the end moment at which the first DCI is received and the start moment at which the first uplink data is sent, and does not monitor the second DCI within another time interval. The foregoing manner avoids useless monitoring performed by the terminal device within another time interval.

In a possible implementation, the first time period includes a time period from a moment that is later than or equal to an end moment corresponding to the first resource to a moment that is delayed by a first time amount from the end moment corresponding to the first resource, and the first time amount is greater than or equal to 0.

For example, the first time amount is predefined, or the first time amount is associated with duration corresponding to the first resource, or the first time amount is associated with a quantity of times of repeated transmission of the first uplink data.

In the foregoing manner, a time at which the terminal device starts to monitor the second DCI (or may be referred to as monitoring the second PDCCH) may be the end moment corresponding to the first resource, or may be later than the end moment corresponding to the first resource. An end time at which the second DCI is monitored may be the moment that is delayed by the first time amount from the end moment corresponding to the first resource. The foregoing manner avoids useless monitoring performed by the terminal device within another time interval.

In a possible implementation, the second time period includes a time period from an end moment of the first time period to a moment that is a first delay later than the end moment corresponding to the first resource, and the first delay is a round-trip delay between a first communication apparatus and a second communication apparatus.

In the foregoing manner, because the round-trip delay in the satellite communication system is excessively long, if the terminal device always performs monitoring in the round-trip delay between sending the first uplink data and receiving feedback DCI (for example, an NDI) of the first uplink data, power consumption is high. Therefore, in the foregoing manner, the terminal device is enabled to monitor or not monitor the DCI only in a period of time, thereby avoiding useless monitoring performed by the terminal device within another time interval.

In a possible implementation, the second time period includes a time period from a moment that is later than or equal to an end moment corresponding to the first resource to a moment that is delayed by a second time amount from the end moment corresponding to the first resource, and the second time amount is greater than or equal to 0.

For example, the second time amount is predefined, or the second time amount is associated with duration corresponding to the first resource, or the second time amount is associated with a quantity of times of repeated transmission of the first uplink data.

In the foregoing manner, a time at which the terminal device starts to monitor the second DCI (or may be referred to as monitoring the second PDCCH) may be the end moment corresponding to the first resource, or may be later than the end moment corresponding to the first resource. An end time at which the second DCI is monitored may be the moment that is delayed by the first time amount from the end moment corresponding to the first resource. The foregoing manner avoids useless monitoring performed by the terminal device within another time interval.

In a possible implementation, the first time period includes a time period from an end moment of the second time period to a moment that is a first delay later than the end moment corresponding to the first resource, and the first delay is a round-trip delay between a first communication apparatus and a second communication apparatus.

In the foregoing manner, because the round-trip delay in the satellite communication system is excessively long, if the terminal device always performs monitoring in the round-trip delay between sending the first uplink data and receiving feedback DCI (for example, an NDI) of the first uplink data, power consumption is high. Therefore, in the foregoing manner, the terminal device is enabled to monitor or not monitor the DCI only in a period of time, thereby avoiding useless monitoring performed by the terminal device within another time interval.

In a possible implementation, before the processing module determines the first time period or the second time period, the transceiver module receives a third PDCCH, where the third PDCCH includes third DCI, the third DCI indicates a third resource, the third resource is used to carry third uplink data, and the determining a first time period or a second time period includes:

determining the first time period or the second time period based on a size of a second time interval, where the second time interval includes a time interval between an end moment corresponding to the first resource to a start moment corresponding to the third resource.

For example, the second DCI may include a new data indicator (NDI), that is, indicates whether the third uplink data is new data to be transmitted or retransmitted data of the first uplink data.

In a possible implementation, the determining the first time period or the second time period based on a size of a second time interval includes: determining the first time period or the second time period based on a third size relationship, where the third size relationship is a size relationship between the size of the second time interval and a third threshold, and the third threshold is greater than 0.

For example, the third threshold is predefined, or the third threshold is associated with duration corresponding to the first resource, or the third threshold is associated with a quantity of times of repeated transmission of the first uplink data.

In a possible implementation, the determining the first time period or the second time period based on a third size relationship includes: if the second time interval is less than or equal to the third threshold, determining that the first time period includes a time period from a moment that is a second delay later than an end moment corresponding to the third resource to a start moment of the second PDCCH, where the second delay is a sum of a third time amount and a first delay, the first delay is a round-trip delay between a first communication apparatus and a second communication apparatus, and the third time amount is greater than or equal to 0.

For example, the third time amount is predefined, or the third time amount is associated with duration corresponding to the first resource, or the third time amount is associated with a quantity of times of repeated transmission of the first uplink data.

In the foregoing manner, the first communication apparatus may be a terminal device such as an IoT device or a handheld terminal device, and the second communication apparatus may be a network device such as a satellite. When the second time interval is small, the terminal device only needs to monitor DCI in a period of time after sending the third uplink data, thereby avoiding useless monitoring performed by the terminal device within another time interval.

In a possible implementation, the determining the first time period or the second time period based on a third size relationship includes: if the second time interval is greater than the third threshold, determining that the first time period includes a time period from a moment that is a first delay later than the end moment corresponding to the first resource to a start moment of the second PDCCH, where the first delay is a round-trip delay between a first communication apparatus and a second communication apparatus.

In the foregoing manner, when the second time interval is large, the satellite may send the second DCI after receiving the first uplink data. Therefore, the terminal device may monitor the second DCI after sending the first uplink data and after the round-trip delay, or may start to monitor the second DCI after a specific time is delayed according to regulations, thereby avoiding useless monitoring performed by the terminal device within another time interval.

In a possible implementation, the determining the first time period or the second time period based on a third size relationship includes: if the second time interval is greater than the third threshold, determining that the first time period includes a time period from a moment that is a first delay later than the end moment corresponding to the first resource to a moment that is the first delay later than an end moment corresponding to the third resource, where the first delay is a round-trip delay between a first communication apparatus and a second communication apparatus.

In a possible implementation, the apparatus includes: if the second DCI is received in the first time period, the second time period includes a time period from an end moment of the second PDCCH to the moment that is the first delay later than the end moment corresponding to the third resource.

In the foregoing manner, after receiving the second DCI in the first time period, the terminal device may stop monitoring, to reduce power consumption.

In a possible implementation, before the processing module determines the first time period or the second time period, the transceiver module sends the first uplink data on a fourth resource, a start moment corresponding to the fourth resource is earlier than a start moment corresponding to the first resource by a fourth time amount, and the determining a first time period or a second time period includes: determining the second time period based on a size relationship between a size of the fourth time amount and a fourth threshold.

For example, the fourth time amount is predefined, or the fourth time amount is associated with duration corresponding to the first resource, or the fourth time amount is associated with a quantity of times of repeated transmission of the first uplink data.

In a possible implementation, an end moment corresponding to the fourth resource is an end moment of an uplink subframe n, and the determining the second time period based on a size relationship between a size of the fourth time amount and a fourth threshold includes: if the fourth time amount is greater than the fourth threshold, determining that the second time period includes a time period from a start moment of a downlink subframe (n+1) to an end moment of a downlink subframe (n+3+Kmac), where Kmac is an offset between boundaries of uplink and downlink frames of a second communication apparatus.

In the foregoing manner, an amount of timing advance performed by the terminal device cannot align boundaries of uplink and downlink subframes of the network device, and the network device delays Kmac subframes to receive the first uplink data. Therefore, the terminal device may delay a time of Kmac to monitor the DCI, thereby reducing power consumption of the terminal device.

In a possible implementation, the first time period includes a time period from a moment that is delayed by a fifth time amount from a start moment corresponding to the first resource to a start moment of the second PDCCH, and the fifth time amount is greater than or equal to 0.

For example, the fifth time amount is predefined, or the fifth time amount is associated with duration corresponding to the first resource, or the fifth time amount is associated with a quantity of times of repeated transmission of the first uplink data.

In the foregoing manner, it is directly specified that the terminal device monitors the second DCI within a fixed time, so as to further reduce power consumption of the terminal device.

In a possible implementation, the first time period includes a time period from a moment that is a third delay later than an end moment corresponding to the first resource to a start moment of the second PDCCH, the third delay is a sum of a sixth time amount and a first delay, and the first delay is a round-trip delay between a first communication apparatus and a second communication apparatus.

In the foregoing manner, it is directly specified that the terminal device monitors the second DCI within a fixed time, so as to further reduce power consumption of the terminal device.

In a possible implementation, a start moment and an end moment of the first time period or the second time period are predefined, and a time interval between the end moment of the first PDCCH and the start moment of the second PDCCH is predefined.

In the foregoing manner, it is directly specified that the terminal device monitors the second DCI within a fixed time, so as to further reduce power consumption of the terminal device. For example, it may be agreed that after receiving two ACKs/NACKs, the network device delivers two PDCCHs at specified time points, including start time of the two PDCCHs and an interval between the two PDCCHs. The terminal device monitors the PDCCH within a corresponding time according to regulations, so that duration for monitoring the PDCCH can be further reduced.

According to a fourth aspect, a data transmission apparatus is provided, where the apparatus includes: a transceiver module, where the transceiver module is configured to send a first physical downlink control channel PDCCH, where the first PDCCH includes first downlink control information DCI, the first DCI indicates a first resource, and the first resource is used to carry first uplink data; and a processing module, where the processing module is configured to determine a first time period or a second time period, where the first time period includes a time period for sending a second PDCCH, and the second time period does not include the second PDCCH; and the processing module is further configured to send the second PDCCH based on the first time period or the second time period.

In a possible implementation, the first uplink data is received on the first resource.

It should be noted that the fourth aspect and implementations may be executed by a network device (for example, a satellite), that is, sending the first PDCCH, receiving the first uplink data, and determining the first time period or the second time period are all based on a perspective of a network device side.

That the first time period includes the time period for monitoring the second PDCCH may be understood as that the network device sends (schedules) the second PDCCH in the first time period. That the second time period does not include the second PDCCH may be understood as that the network device does not send (schedule) the second PDCCH in the second time period.

In the foregoing manner, the terminal device is enabled to monitor the second PDCCH in the first time period, and not monitor the second PDCCH in the second time period. This avoids a case that the terminal device monitors a PDCCH for a long time, and reduces power consumption of the terminal device. Especially in a satellite communication system, due to an excessively long round-trip delay, duration for the terminal device to monitor the PDCCH is long.

In a possible implementation, the second PDCCH includes second DCI, the second DCI indicates a second resource, and the second resource is used to carry second uplink data.

In a possible implementation, the second uplink data is received on the second resource.

For example, the second DCI may include a new data indicator (NDI), that is, indicates whether the second uplink data is new data to be transmitted or retransmitted data of the first uplink data.

In a possible implementation, the determining a first time period or a second time period includes: determining the first time period or the second time period based on a size of a first time interval, where the first time interval includes a time interval between an end moment of the first PDCCH and a start moment corresponding to the first resource.

It should be noted that it may be understood from a perspective of the network device herein. For example, the first time interval includes a time interval between an end moment at which the network device sends the first PDCCH and a start moment corresponding to the first resource (that is, receiving the first uplink data). For another implementation of the second aspect, refer to the description herein.

In the foregoing manner, the terminal device is enabled to flexibly select the first time period or the second time period, so as to flexibly monitor the second PDCCH.

In a possible implementation, the determining the first time period or the second time period based on a size of a first time interval includes: determining the first time period or the second time period based on at least one of a first size relationship and a second size relationship, where the first size relationship is a size relationship between the size of the first time interval and a first threshold, the second size relationship is a size relationship between the size of the first time interval and a second threshold, and the second threshold is greater than the first threshold.

For example, the first threshold or the second threshold is predefined, or the first threshold or the second threshold is associated with duration corresponding to the first resource, or the first threshold or the second threshold is associated with a quantity of times of repeated transmission of the first uplink data.

In a possible implementation, the first time period and the second time period may be further determined.

In a possible implementation, the determining the first time period or the second time period based on at least one of a first size relationship and a second size relationship includes: if the first time interval is less than or equal to the first threshold, determining that the second time period includes a time period from the end moment of the first PDCCH to the start moment corresponding to the first resource.

In the foregoing manner, when a time interval between sending the first DCI and receiving the first uplink data is small, the terminal device may not monitor the second DCI within the time interval, that is, the network device does not schedule the second PDCCH within the time. This can reduce a time for the terminal device to monitor DCI, and reduce power consumption.

In a possible implementation, the determining the first time period or the second time period based on at least one of a first size relationship and a second size relationship includes: if the first time interval is less than or equal to the first threshold, determining that the first time period includes a time period from the end moment of the first PDCCH to the start moment corresponding to the first resource.

In the foregoing manner, when a time interval between sending the first DCI and receiving the first uplink data is small, it may be specified that the terminal device needs to monitor the second DCI only within the time interval, that is, the network device schedules the second PDCCH within the time, and does not schedule the second PDCCH in another time period. The foregoing manner avoids useless monitoring performed by the terminal device within another time interval.

In a possible implementation, the determining the first time period or the second time period based on at least one of a first size relationship and a second size relationship includes: if the first time interval is greater than the first threshold and less than or equal to the second threshold, determining that the first time period includes a time period from the end moment of the first PDCCH to a start moment of a previous transmission time unit of the start moment corresponding to the first resource.

For example, a transmission time unit may be another unit such as a slot, a subframe, or a millisecond.

In the foregoing manner, the terminal device needs to monitor the second DCI only within the time period, that is, the network device schedules the second PDCCH within the time period, and does not schedule the second PDCCH in another time period. The foregoing manner avoids useless monitoring performed by the terminal device within another time interval.

In a possible implementation, the determining the first time period or the second time period based on at least one of a first size relationship and a second size relationship includes: if the first time interval is greater than the second threshold, determining that the first time period includes a time period from the end moment of the first PDCCH to a start moment of a previous transmission time unit that is earlier than the start moment corresponding to the first resource.

In the foregoing manner, the terminal device needs to monitor the second DCI only within the time period, that is, the network device schedules the second PDCCH within the time period, and does not schedule the second PDCCH in another time period. The foregoing manner avoids useless monitoring performed by the terminal device within another time interval.

In a possible implementation, if the second DCI is sent in the first time period, the second time period includes a time period from an end moment of the second PDCCH to the start moment corresponding to the first resource.

In the foregoing manner, if the network device sends the second DCI in the first time period, it also means that the terminal device receives the second DCI in the first time period. In this case, the terminal device does not need to monitor the second DCI after receiving the second DCI and before sending the first uplink data. The foregoing manner avoids useless monitoring performed by the terminal device within another time interval.

In a possible implementation, the determining the first time period or the second time period based on at least one of a first size relationship and a second size relationship includes: if the first time interval is greater than the second threshold, determining that the second time period includes a time period from the end moment of the first PDCCH to a start moment of a previous transmission time unit that is earlier than the start moment corresponding to the first resource, and the first time period includes a time period from an end moment of the second time period to the start moment of the previous transmission time unit of the start moment corresponding to the first resource.

In the foregoing manner, when the first time interval is large, the terminal device may monitor the second DCI only in a period of time from the end moment at which the first DCI is received and the start moment at which the first uplink data is sent, and does not monitor the second DCI within another time interval. The foregoing manner avoids useless monitoring performed by the terminal device within another time interval.

In a possible implementation, the first time period includes a time period from a moment that is later than or equal to an end moment of the first PDCCH to a moment that is delayed by a first time amount from the end moment of the first PDCCH, and the first time amount is greater than or equal to 0.

For example, the first time amount is predefined, or the first time amount is associated with duration corresponding to the first resource, or the first time amount is associated with a quantity of times of repeated transmission of the first uplink data.

In the foregoing manner, a time at which the terminal device starts to monitor the second DCI (or may be referred to as monitoring the second PDCCH) may be the end moment corresponding to the first resource, or may be later than the end moment corresponding to the first resource. An end time at which the second DCI is monitored may be the moment that is delayed by the first time amount from the end moment corresponding to the first resource. The foregoing manner avoids useless monitoring performed by the terminal device within another time interval.

In a possible implementation, the second time period includes a time period from an end moment of the first time period to the start moment corresponding to the first resource.

In the foregoing manner, because the round-trip delay in the satellite communication system is excessively long, if the terminal device always performs monitoring in the round-trip delay between sending the first uplink data and receiving feedback DCI (for example, an NDI) of the first uplink data, power consumption is high. Therefore, in the foregoing manner, the terminal device is enabled to monitor or not monitor the DCI only in a period of time, thereby avoiding useless monitoring performed by the terminal device within another time interval.

In a possible implementation, the second time period includes a time period from a moment that is later than or equal to an end moment of the first PDCCH to a moment that is delayed by a second time amount from the end moment of the first PDCCH, and the second time amount is greater than or equal to 0.

For example, the second time amount is predefined, or the second time amount is associated with duration corresponding to the first resource, or the second time amount is associated with a quantity of times of repeated transmission of the first uplink data.

In the foregoing manner, a time at which the network device starts to send the second DCI (or may be referred to as scheduling the second PDCCH) may be the end moment corresponding to the first resource, or may be later than the end moment corresponding to the first resource, or may be the moment that is delayed by the first time amount from the end moment corresponding to the first resource. The foregoing manner avoids useless monitoring performed by the terminal device within another time interval.

In a possible implementation, the first time period includes a time period from an end moment of the second time period to the start moment corresponding to the first resource.

In the foregoing manner, because the round-trip delay in the satellite communication system is excessively long, if the terminal device always performs monitoring in the round-trip delay between sending the first uplink data and receiving feedback DCI (for example, an NDI) of the first uplink data, power consumption is high. Therefore, in the foregoing manner, the terminal device is enabled to monitor or not monitor the DCI only in a period of time, thereby avoiding useless monitoring performed by the terminal device within another time interval.

In a possible implementation, before the first time period or the second time period is determined, a third PDCCH is received, the third PDCCH includes third DCI, the third DCI indicates a third resource, the third resource is used to carry third uplink data, and the determining a first time period or a second time period includes: determining the first time period or the second time period based on a size of a second time interval, where the second time interval includes a time interval between an end moment corresponding to the first resource to a start moment corresponding to the third resource.

For example, the second DCI may include a new data indicator (NDI), that is, indicates whether the third uplink data is new data to be transmitted or retransmitted data of the first uplink data.

In a possible implementation, the determining the first time period or the second time period based on a size of a second time interval includes: determining the first time period or the second time period based on a third size relationship, where the third size relationship is a size relationship between the size of the second time interval and a third threshold, and the third threshold is greater than 0.

For example, the third threshold is predefined, or the third threshold is associated with duration corresponding to the first resource, or the third threshold is associated with a quantity of times of repeated transmission of the first uplink data.

In a possible implementation, the determining the first time period or the second time period based on a third size relationship includes: if the second time interval is less than or equal to the third threshold, determining that the first time period includes a time period from a moment that is after an end moment corresponding to the third resource and after a third time amount to a start moment of the second PDCCH, where the third time amount is greater than or equal to 0.

For example, the third time amount is predefined, or the third time amount is associated with duration corresponding to the first resource, or the third time amount is associated with a quantity of times of repeated transmission of the first uplink data.

In the foregoing manner, the first communication apparatus may be a terminal device such as an IoT device or a handheld terminal device, and the second communication apparatus may be a network device such as a satellite. When the second time interval is small, the terminal device only needs to monitor DCI in a period of time after sending the third uplink data, thereby avoiding useless monitoring performed by the terminal device within another time interval.

In a possible implementation, the determining the first time period or the second time period based on a third size relationship includes: if the second time interval greater than the third threshold, determining that the first time period includes a time period from the end moment corresponding to the first resource to the start moment of the second PDCCH.

In the foregoing manner, when the second time interval is large, the satellite may send the second DCI after receiving the first uplink data. Therefore, the terminal device may monitor the second DCI after sending the first uplink data and after the round-trip delay, or may start to monitor the second DCI after a specific time is delayed according to regulations, thereby avoiding useless monitoring performed by the terminal device within another time interval.

In a possible implementation, the determining the first time period or the second time period based on a third size relationship includes: if the second time interval is greater than the third threshold, the first time period includes a time period from the end moment corresponding to the first resource to the end moment corresponding to the third resource.

In a possible implementation, if the second PDCCH is sent in the first time period, the second time period includes a time period from an end moment of the second PDCCH to the end moment corresponding to the third resource.

In the foregoing manner, after receiving the second DCI in the first time period, the terminal device may stop monitoring, to reduce power consumption.

In a possible implementation, before the first time period or the second time period is determined, the first uplink data is received on a fourth resource, where a start moment corresponding to the fourth resource is offset by Kmac subframes relative to a start moment corresponding to the first resource, Kmac is greater than or equal to 0, and the determining a first time period or a second time period includes:

determining the second time period based on a size relationship between a size of Kmac and a fourth threshold.

For example, the fourth time amount is predefined, or the fourth time amount is associated with duration corresponding to the first resource, or the fourth time amount is associated with a quantity of times of repeated transmission of the first uplink data.

In a possible implementation, an end moment corresponding to the fourth resource is an end moment of an uplink subframe n, and the determining the second time period based on a size relationship between a size of Kmac and a fourth threshold includes: if the size of Kmac is greater than the fourth threshold, determining that the second time period includes a time period from a start moment of a downlink subframe (n+1) to an end moment of a downlink subframe (n+3+Kmac).

In the foregoing manner, an amount of timing advance performed by the terminal device cannot align boundaries of uplink and downlink subframes of the network device, and the network device delays Kmac subframes to receive the first uplink data. Therefore, the terminal device may delay a time of Kmac to monitor the DCI, thereby reducing power consumption of the terminal device.

In a possible implementation, a start moment and an end moment of the first time period or the second time period are predefined, and a time interval between the end moment of the first PDCCH and the start moment of the second PDCCH is predefined.

In the foregoing manner, it is directly specified that the terminal device monitors the second DCI within a fixed time, so as to further reduce power consumption of the terminal device. For example, it may be agreed that after receiving two ACKs/NACKs, the network device delivers two PDCCHs at specified time points, including start time of the two PDCCHs and an interval between the two PDCCHs. The terminal device monitors the PDCCH within a corresponding time according to regulations, so that duration for monitoring the PDCCH can be further reduced.

According to a fifth aspect, a communication apparatus is provided. The communication apparatus may be the first communication apparatus in the foregoing method embodiments, or may be a chip disposed in a first communication apparatus. The communication apparatus includes a communication interface and a processor, and optionally, further includes a memory. The memory is configured to store a computer program or instructions. The processor is coupled to the memory and the communication interface. When the processor executes the computer program or the instructions, the communication apparatus is enabled to perform the method performed by the first communication apparatus in the foregoing method embodiments.

For example, the memory and the processor may be integrated together, or may be independent components.

According to a sixth aspect, a communication apparatus is provided. The communication apparatus may be the second communication apparatus in the foregoing method embodiments, or may be a chip disposed in the second communication apparatus. The communication apparatus includes a communication interface and a processor, and optionally, further includes a memory. The memory is configured to store a computer program or instructions. The processor is coupled to the memory and the communication interface. When the processor executes the computer program or the instructions, the communication apparatus is enabled to perform the method performed by the second communication apparatus in the foregoing method embodiments.

For example, the memory and the processor may be integrated together, or may be independent components.

According to a seventh aspect, a computer program product is provided, where the computer program product includes computer program code, and when the computer program code is run, the method performed by the first communication apparatus in the foregoing aspects is performed.

In the foregoing manner, the first communication apparatus may be a terminal device.

According to an eighth aspect, a computer program product is provided, where the computer program product includes computer program code, and when the computer program code is run, the method performed by the second communication apparatus in the foregoing aspects is performed.

In the foregoing manner, the second communication apparatus may be a network device, for example, a satellite.

According to a ninth aspect, this application provides a chip system. The chip system includes a processor, configured to implement functions of the first communication apparatus in the methods in the foregoing aspects. In a possible design, the chip system further includes a memory, configured to store program instructions and/or data. The chip system may include a chip, or may include a chip and another discrete component.

According to a tenth aspect, this application provides a chip system. The chip system includes a processor, configured to implement functions of the second communication apparatus in the methods in the foregoing aspects. In a possible design, the chip system further includes a memory, configured to store program instructions and/or data. The chip system may include a chip, or may include a chip and another discrete component.

According to an eleventh aspect, this application provides a computer-readable storage medium. The computer-readable storage medium stores a computer program. When the computer program is run, the method performed by the first communication apparatus in the foregoing aspects is implemented.

According to a twelfth aspect, this application provides a computer-readable storage medium. The computer-readable storage medium stores a computer program. When the computer program is run, the method performed by the second communication apparatus in the foregoing aspects is implemented.

In this application, the first communication apparatus determines, based on a data transmission manner, a manner of monitoring a PDCCH, so as to reduce impact of long duration for monitoring the PDCCH caused by an excessively long round-trip delay in a satellite communication system, and reduce power consumption of the first communication apparatus.

DETAILED DESCRIPTION OF ILLUSTRATIVE EMBODIMENTS

Figure 1:
FIG. 1 is a diagram of an example of an application scenario applicable to an embodiment of this application.
Figure 1:
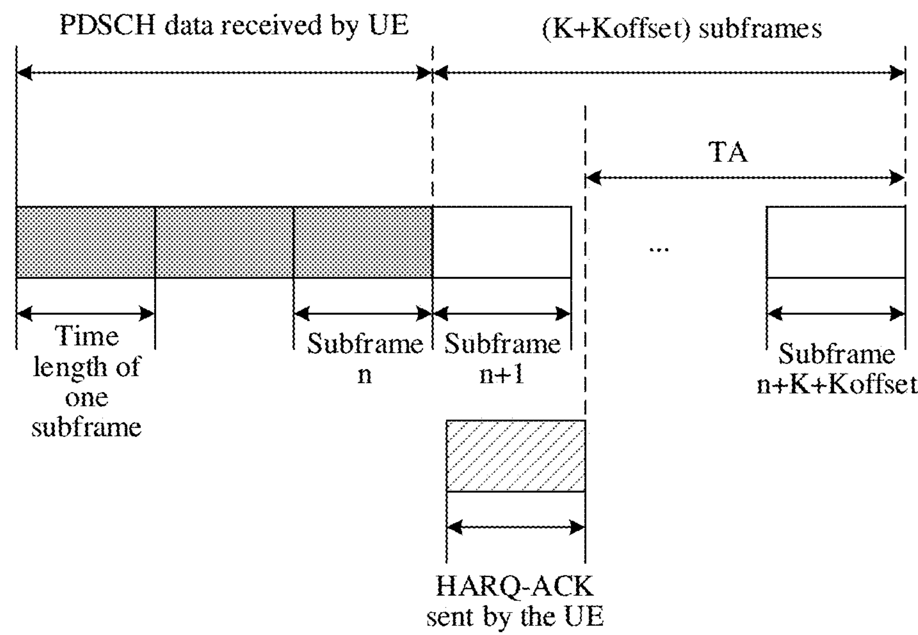

The following describes technical solutions of this application with reference to accompanying drawings. Clearly, the described embodiments are some but not all of embodiments of this application. All other embodiments obtained by a person of ordinary skill in the art based on embodiments of this application without creative efforts shall fall within the protection scope of this application.

It should be further understood that "first", "second", "third", "fourth", "fifth", and "sixth" in embodiments of this application are merely intended for distinguishing, and should not constitute any limitation on this application.

The technical solutions in embodiments of this application may be applied to various communication systems, for example, a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5th generation (5G) system or a new radio (NR) system, and a future sixth generation (6G) system.

The terminal device in embodiments of this application may also be referred to as user equipment (UE), an access terminal, a terminal device unit (subscriber unit), a terminal device station, a mobile console, a mobile station (MS), a remote station, a remote terminal, a mobile device, a user terminal, a terminal, a wireless communication device, a terminal device agent, or a terminal device apparatus. The terminal device may include various handheld devices, in-vehicle devices, internet of things (IoT) devices, wearable devices, computing devices, or other processing devices connected to a wireless modem that have a wireless communication function. The terminal device may further include a user unit, a cellular phone, a smartphone, a wireless data card, a personal digital assistant (PDA) computer, a tablet computer, a wireless modem, a handheld device (handset), a laptop computer, a machine type communication (MTC) terminal, or a station (ST) in a wireless local area network (WLAN). The terminal device may be a cellular phone, a cordless telephone, a session initiation protocol (SIP) telephone, a wireless local loop (WLL) station and a next-generation communication system, for example, a terminal device in a 5G network, or a terminal device in a future evolved PLMN network.

The network device in embodiments of this application may be a device configured to communicate with a terminal device. The network device may be a base station (base transceiver station, BTS) in a global mobile communications (GSM) system or a code division multiple access (CDMA) system, or may be a base station (NodeB, NB) in a wideband code division multiple access (WCDMA) system, or may be an evolved base station (evolved NodeB, eNB or eNodeB) in an LTE system, or may be a radio controller in a cloud radio access network (CRAN) scenario, or may be a satellite base station in a satellite communication system. Alternatively, the network device may be a relay station, an access point, an in-vehicle device, a wearable device, a network device in a 5G network, a network device in a future evolved PLMN network, or the like. This is not limited in embodiments of this application.

It should be noted that the technical solutions in embodiments of this application are applicable to an architecture of a central unit (CU) and a distributed unit (DU), or are applicable to an architecture in which a control plane (CP) and a user plane (UP) are separated. This is not limited in this application.

For ease of understanding, the following briefly describes basic concepts in embodiments of this application.

Timing advance (TA): In a communication system, to ensure that uplink data sent by UE under a base station can synchronously arrive at the base station, in an uplink transmission process, the UE needs to maintain a TA, and the base station adjusts the timing advance for the UE based on an offset status of an uplink signal. In a satellite communication system, because a round-trip delay between the UE and a satellite base station is large, a TA value in the satellite communication system is larger than a TA in a terrestrial system. For example, as shown in FIG. 1, FIG. 1 is a diagram of an example of an application scenario applicable to an embodiment of this application. After UE receives PDSCH data in a subframe n, a base station needs to receive, in a subframe (n+K+Koffset) (all n, K, and Koffset are positive integers), hybrid automatic repeat request (HARQ)-ACK data sent by the UE. Because a round-trip delay is large, the UE needs to send the HARQ-ACK data ahead of TA time units, where the time unit may alternatively be a slot, a symbol, a millisecond, a sampling interval, or the like. It should be noted that TA involved in embodiments of this application also conforms to the foregoing description of the TA.

Figure 2:
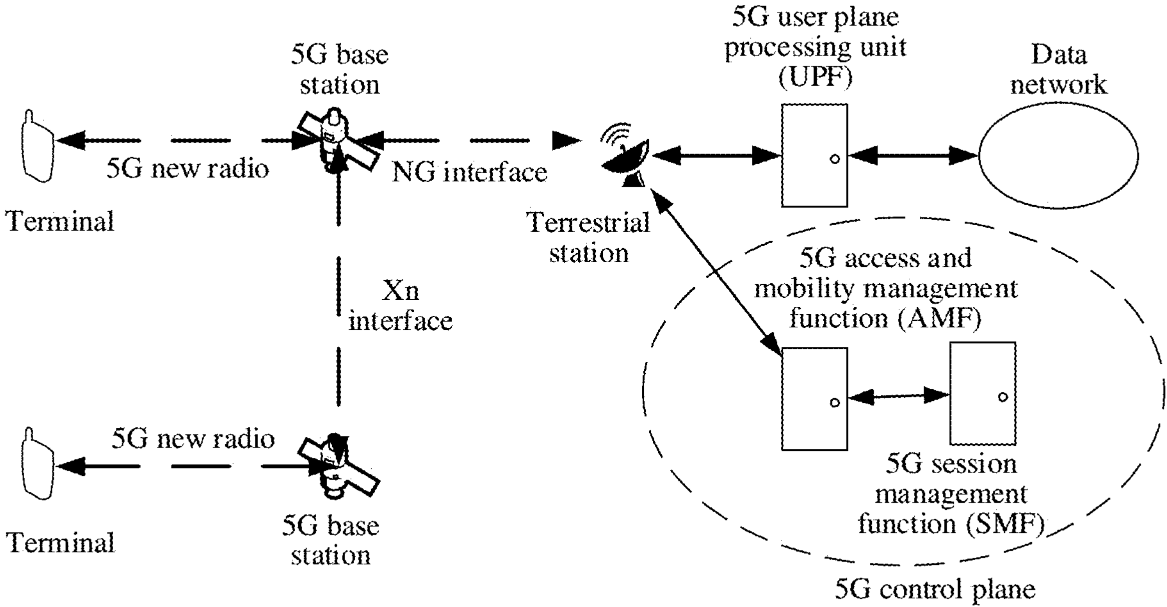
FIG. 2 is a diagram of an example of an application scenario applicable to an embodiment of this application.

FIG. 2 is a diagram of an example of an application scenario applicable to an embodiment of this application. In FIG. 2, a terrestrial mobile terminal accesses a network through a 5G new radio, and a 5G base station is deployed on a satellite, and is connected to a terrestrial core network through a radio link. In addition, a radio link exists between satellites to implement signaling exchange and user data scheduling between base stations. Network elements in FIG. 2 and their interfaces are described as follows.

Terminal: Refer to the foregoing description of the terminal device. In addition, the terminal device may access a satellite network through an air interface and initiate a service such as a call or a network access.

5G base station: In a 5G system, the 5G base station mainly provides a radio access service, schedules a radio resource to an access terminal, and provides a reliable radio transmission protocol, a data encryption protocol, and the like.

5G core network: provides services such as user access control, mobility management, session management, user security authentication, and charging. The 5G core network includes a plurality of functional units, which can be divided into a control plane functional entity and a data plane functional entity. An access and mobility management unit (AMF) is responsible for user access management, security authentication, and mobility management. A user plane unit (UPF) is responsible for managing functions such as user plane data transmission and traffic statistics.

A terrestrial station: is responsible for forwarding signaling and service data between the satellite base station and the 5G core network.

5G new radio: provides a radio link between the terminal and the base station.

An Xn interface: is an interface between the 5G base stations, and is mainly for signaling exchange such as handover.

NG interface: is an interface between the 5G base station and the 5G core network, and is mainly used to exchange non-access stratum (NAS) signaling of the core network and user service data.

In the foregoing scenario, because the round-trip delay between the terminal device and the network device (for example, a satellite) is large in the satellite communication system, to meet this requirement, a timing advance value of the terminal device needs to be increased. Therefore, a K offset value (Koffset) is added to a current slot offset value K. As a result, the terminal device needs to monitor PDCCH data (that is, DCI) for an excessively long time, and power consumption increases. In this application, a rule for monitoring DCI by a terminal device in a satellite communication system is designed to reduce monitoring duration, thereby reducing power consumption.

Figure 3:
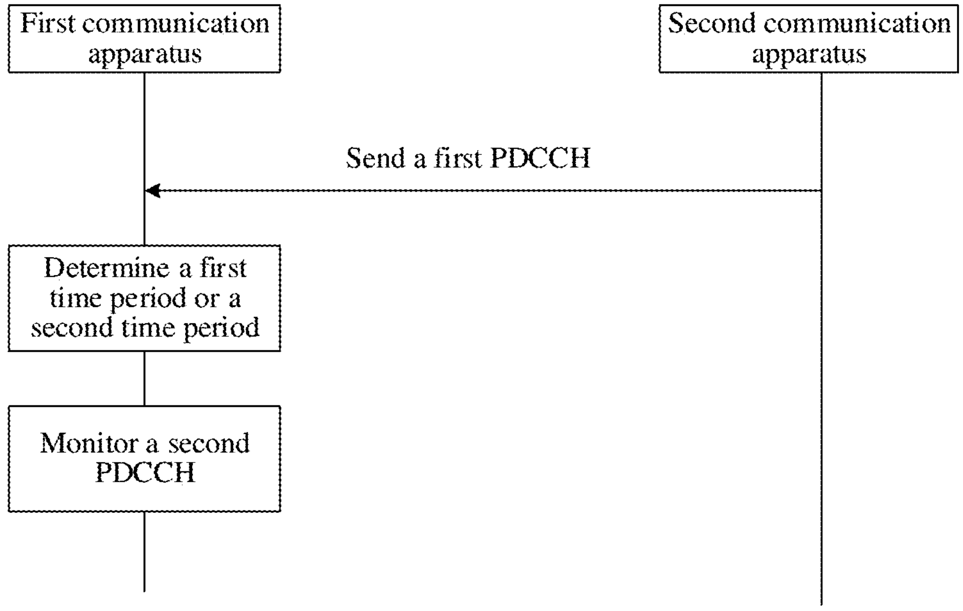
FIG. 3 is a schematic diagram of an example of a data transmission method according to an embodiment of this application.

As shown in a method 100 in FIG. 3, FIG. 3 is a schematic diagram of an example of a data transmission method according to an embodiment of this application.

S110: A second communication apparatus sends a first physical downlink control channel PDCCH, and a first communication apparatus receives the first PDCCH.

The first PDCCH includes first downlink control information DCI, the first DCI indicates a first resource, and the first resource is used to carry first uplink data.

In a possible implementation, the first uplink data is sent on the first resource.

The second communication apparatus may be a network device, for example, a satellite. The first communication apparatus may be a terminal device, for example, an IoT device or a handheld terminal device. The IoT device may be more sensitive to power consumption, and therefore is more applicable.

S120: The first communication apparatus determines a first time period or a second time period.

The first time period includes a time period for monitoring a second PDCCH, and the second time period does not include the second PDCCH.

That the first time period includes the time period for monitoring the second PDCCH may be understood as that the terminal device monitors the second PDCCH in the first time period. That the second time period does not include the second PDCCH may be understood as that the terminal device does not monitor the second PDCCH in the second time period.

In the foregoing manner, the terminal device is enabled to monitor the second PDCCH in the first time period, and not monitor the second PDCCH in the second time period. This avoids a case that the terminal device monitors a PDCCH for a long time, and reduces power consumption of the terminal device. Especially in a satellite communication system, due to an excessively long round-trip delay, duration for the terminal device to monitor the PDCCH is long.

In a possible implementation, the second PDCCH includes second DCI, the second DCI indicates a second resource, and the second resource is used to carry second uplink data.

In a possible implementation, the second uplink data is sent on the second resource.

For example, the second DCI may include a new data indicator (NDI), that is, indicates whether the second uplink data is new data to be transmitted or retransmitted data of the first uplink data.

In a possible implementation, the determining a first time period or a second time period includes: determining the first time period or the second time period based on a size of a first time interval, where the first time interval includes a time interval between an end moment at which the first PDCCH is received and a start moment corresponding to the first resource.

It should be noted that it may be understood from a perspective of the terminal device herein. For example, the first time interval includes a time interval between an end moment at which the terminal device receives the first PDCCH and a start moment corresponding to the first resource (that is, sending the first uplink data). For another implementation of the method 100, refer to the description herein.

In the foregoing manner, the terminal device is enabled to flexibly select the first time period or the second time period, so as to flexibly monitor the second PDCCH.

In a possible implementation, the determining the first time period or the second time period based on a size of a first time interval includes:

determining the first time period or the second time period based on at least one of a first size relationship and a second size relationship, where the first size relationship is a size relationship between the size of the first time interval and a first threshold, the second size relationship is a size relationship between the size of the first time interval and a second threshold, and the second threshold is greater than the first threshold.

For example, the first threshold or the second threshold is predefined, or the first threshold or the second threshold is associated with duration corresponding to the first resource, or the first threshold or the second threshold is associated with a quantity of times of repeated transmission of the first uplink data.

In a possible implementation, the first time period and the second time period may be further determined.

In a possible implementation, the determining the first time period or the second time period based on at least one of a first size relationship and a second size relationship includes: if the first time interval is less than or equal to the first threshold, determining that the second time period includes a time period from the end moment of the first PDCCH to the start moment corresponding to the first resource.

In the foregoing manner, when a time interval between receiving the first DCI and sending the first uplink data is small, the terminal device may not monitor the second DCI within the time interval, that is, a network device does not schedule the second PDCCH within the time. This can reduce a time for the terminal device to monitor DCI, and reduce power consumption.

In a possible implementation, the determining the first time period or the second time period based on at least one of a first size relationship and a second size relationship includes: if the first time interval is less than or equal to the first threshold, determining that the first time period includes a time period from the end moment of the first PDCCH to the start moment corresponding to the first resource.

In the foregoing manner, when a time interval between receiving the first DCI and sending the first uplink data is small, it may be specified that the terminal device needs to monitor the second DCI only within the time interval, that is, the network device schedules the second PDCCH within the time, and does not schedule the second PDCCH in another time period. The foregoing manner avoids useless monitoring performed by the terminal device within another time interval.

In a possible implementation, the determining the first time period or the second time period based on at least one of a first size relationship and a second size relationship includes: if the first time interval is greater than the first threshold and less than or equal to the second threshold, determining that the first time period includes a time period from the end moment of the first PDCCH to a start moment of a previous transmission time unit of the start moment corresponding to the first resource.

For example, a transmission time unit may be another unit such as a slot (slot), a subframe, or a millisecond.

In the foregoing manner, the terminal device needs to monitor the second DCI only within the time period, that is, the network device schedules the second PDCCH within the time period, and does not schedule the second PDCCH in another time period. The foregoing manner avoids useless monitoring performed by the terminal device within another time interval.

In a possible implementation, the determining the first time period or the second time period based on at least one of a first size relationship and a second size relationship includes: if the first time interval is greater than the second threshold, determining that the first time period includes a time period from the end moment of the first PDCCH to a start moment of a previous transmission time unit that is earlier than the start moment corresponding to the first resource.

In the foregoing manner, the terminal device needs to monitor the second DCI only within the time period, that is, the network device schedules the second PDCCH within the time period, and does not schedule the second PDCCH in another time period. The foregoing manner avoids useless monitoring performed by the terminal device within another time interval.

In a possible implementation, the method further includes: if the second DCI is received in the first time period, determining that the second time period includes a time period from an end moment of the second PDCCH to the start moment corresponding to the first resource.

In the foregoing manner, if the terminal device receives the second DCI in the first time period, the terminal device does not need to monitor the second DCI after receiving the second DCI and before sending the first uplink data. The foregoing manner avoids useless monitoring performed by the terminal device within another time interval.

In a possible implementation, the method further includes: if the second DCI is not received in the first time period, determining that the second time period includes a time period from an end moment of the first time period to the start moment corresponding to the first resource.

In the foregoing manner, if the terminal device does not receive the second DCI in the first time period, the terminal device does not need to monitor the second DCI from the end moment of the first time period to the start moment at which the first uplink data is sent, and the network device does not schedule the second DCI within the time period. The foregoing manner avoids useless monitoring performed by the terminal device within another time interval.

In a possible implementation, the determining the first time period or the second time period based on at least one of a first size relationship and a second size relationship includes: if the first time interval is greater than the second threshold, determining that the second time period includes a time period from the end moment of the first PDCCH to a start moment of a previous transmission time unit that is earlier than the start moment corresponding to the first resource, and the first time period includes a time period from an end moment of the second time period to the start moment of the previous transmission time unit of the start moment corresponding to the first resource.

In the foregoing manner, when the first time interval is large, the terminal device may monitor the second DCI only in a period of time from the end moment at which the first DCI is received and the start moment at which the first uplink data is sent, and does not monitor the second DCI within another time interval. The foregoing manner avoids useless monitoring performed by the terminal device within another time interval.

In a possible implementation, the first time period includes a time period from a moment that is later than or equal to an end moment corresponding to the first resource to a moment that is delayed by a first time amount from the end moment corresponding to the first resource, and the first time amount is greater than or equal to 0.

For example, the first time amount is predefined, or the first time amount is associated with duration corresponding to the first resource, or the first time amount is associated with a quantity of times of repeated transmission of the first uplink data.

In the foregoing manner, a time at which the terminal device starts to monitor the second DCI (or may be referred to as monitoring the second PDCCH) may be the end moment corresponding to the first resource, or may be later than the end moment corresponding to the first resource. An end time at which the second DCI is monitored may be the moment that is delayed by the first time amount from the end moment corresponding to the first resource. The foregoing manner avoids useless monitoring performed by the terminal device within another time interval.

In a possible implementation, the second time period includes a time period from an end moment of the first time period to a moment that is a first delay later than the end moment corresponding to the first resource, and the first delay is a round-trip delay between the second communication apparatus and the first communication apparatus.

In the foregoing manner, because the round-trip delay in the satellite communication system is excessively long, if the terminal device always performs monitoring in the round-trip delay between sending the first uplink data and receiving feedback DCI (for example, an NDI) of the first uplink data, power consumption is high. Therefore, in the foregoing manner, the terminal device is enabled to monitor or not monitor the DCI only in a period of time, thereby avoiding useless monitoring performed by the terminal device within another time interval.

In a possible implementation, the second time period includes a time period from a moment that is later than or equal to an end moment corresponding to the first resource to a moment that is delayed by a second time amount from the end moment corresponding to the first resource, and the second time amount is greater than or equal to 0.

For example, the second time amount is predefined, or the second time amount is associated with duration corresponding to the first resource, or the second time amount is associated with a quantity of times of repeated transmission of the first uplink data.

In the foregoing manner, a time at which the terminal device starts to monitor the second DCI (or may be referred to as monitoring the second PDCCH) may be the end moment corresponding to the first resource, or may be later than the end moment corresponding to the first resource. An end time at which the second DCI is monitored may be the moment that is delayed by the first time amount from the end moment corresponding to the first resource. The foregoing manner avoids useless monitoring performed by the terminal device within another time interval.

In a possible implementation, the first time period includes a time period from an end moment of the second time period to a moment that is a first delay later than the end moment corresponding to the first resource, and the first delay is a round-trip delay between the second communication apparatus and the first communication apparatus.

In the foregoing manner, because the round-trip delay in the satellite communication system is excessively long, if the terminal device always performs monitoring in the round-trip delay between sending the first uplink data and receiving feedback DCI (for example, an NDI) of the first uplink data, power consumption is high. Therefore, in the foregoing manner, the terminal device is enabled to monitor or not monitor the DCI only in a period of time, thereby avoiding useless monitoring performed by the terminal device within another time interval.

In a possible implementation, before the first time period or the second time period is determined, a third PDCCH is received, the third PDCCH includes third DCI, the third DCI indicates a third resource, the third resource is used to carry third uplink data, and the determining a first time period or a second time period includes:

determining the first time period or the second time period based on a size of a second time interval, where the second time interval includes a time interval between an end moment corresponding to the first resource to a start moment corresponding to the third resource.

For example, the second DCI may include a new data indicator (NDI), that is, indicates whether the third uplink data is new data to be transmitted or retransmitted data of the first uplink data.

In a possible implementation, the determining the first time period or the second time period based on a size of a second time interval includes: determining the first time period or the second time period based on a third size relationship, where the third size relationship is a size relationship between the size of the second time interval and a third threshold, and the third threshold is greater than 0.

For example, the third threshold is predefined, or the third threshold is associated with duration corresponding to the first resource, or the third threshold is associated with a quantity of times of repeated transmission of the first uplink data.

In a possible implementation, the determining the first time period or the second time period based on a third size relationship includes: if the second time interval is less than or equal to the third threshold, determining that the first time period includes a time period from a moment that is a second delay later than an end moment corresponding to the third resource to a start moment of the second PDCCH, where the second delay is a sum of a third time amount and a first delay, the first delay is a round-trip delay between the second communication apparatus and the first communication apparatus, and the third time amount is greater than or equal to 0.

For example, the third time amount is predefined, or the third time amount is associated with duration corresponding to the first resource, or the third time amount is associated with a quantity of times of repeated transmission of the first uplink data.

In the foregoing manner, the second communication apparatus may be a terminal device such as an IoT device or a handheld terminal device, and the first communication apparatus may be a network device such as a satellite. When the second time interval is small, the terminal device only needs to monitor DCI in a period of time after sending the third uplink data, thereby avoiding useless monitoring performed by the terminal device within another time interval.

In a possible implementation, the determining the first time period or the second time period based on a third size relationship includes: if the second time interval is greater than the third threshold, determining that the first time period includes a time period from a moment that is a first delay later than the end moment corresponding to the first resource to a start moment of the second PDCCH, where the first delay is a round-trip delay between the second communication apparatus and the first communication apparatus.

In the foregoing manner, when the second time interval is large, the satellite may send the second DCI after receiving the first uplink data. Therefore, the terminal device may monitor the second DCI after sending the first uplink data and after the round-trip delay, or may start to monitor the second DCI after a specific time is delayed according to regulations, thereby avoiding useless monitoring performed by the terminal device within another time interval.

In a possible implementation, the determining the first time period or the second time period based on a third size relationship includes: if the second time interval is greater than the third threshold, determining that the first time period includes a time period from a moment that is a first delay later than the end moment corresponding to the first resource to a moment that is the first delay later than an end moment corresponding to the third resource, where the first delay is a round-trip delay between the second communication apparatus and the first communication apparatus.

In a possible implementation, the method includes: if the second DCI is received in the first time period, determining that the second time period includes a time period from an end moment of the second PDCCH to the moment that is the first delay later than the end moment corresponding to the third resource.

In the foregoing manner, after receiving the second DCI in the first time period, the terminal device may stop monitoring, to reduce power consumption.

In a possible implementation, before the first time period or the second time period is determined, the first uplink data is sent on a fourth resource, a start moment corresponding to the fourth resource is earlier than a start moment corresponding to the first resource by a fourth time amount, and the determining a first time period or a second time period includes: determining the second time period based on a size relationship between a size of the fourth time amount and a fourth threshold.

For example, the fourth time amount is predefined, or the fourth time amount is associated with duration corresponding to the first resource, or the fourth time amount is associated with a quantity of times of repeated transmission of the first uplink data.

In a possible implementation, an end moment corresponding to the fourth resource is an end moment of an uplink subframe n, and the determining the second time period based on a size relationship between a size of the fourth time amount and a fourth threshold includes: if the fourth time amount is greater than the fourth threshold, determining that the second time period includes a time period from a start moment of a downlink subframe (n+1) to an end moment of a downlink subframe (n+3+Kmac), where Kmac is an offset between boundaries of uplink and downlink frames of a second communication apparatus.

In the foregoing manner, an amount of timing advance performed by the terminal device cannot align boundaries of uplink and downlink subframes of the network device, and the network device delays Kmac subframes to receive the first uplink data. Therefore, the terminal device may delay a time of Kmac to monitor the DCI, thereby reducing power consumption of the terminal device.

In a possible implementation, the first time period includes a time period from a moment that is delayed by a fifth time amount from a start moment corresponding to the first resource to a start moment of the second PDCCH, and the fifth time amount is greater than or equal to 0.

For example, the fifth time amount is predefined, or the fifth time amount is associated with duration corresponding to the first resource, or the fifth time amount is associated with a quantity of times of repeated transmission of the first uplink data.

In the foregoing manner, it is directly specified that the terminal device monitors the second DCI within a fixed time, so as to further reduce power consumption of the terminal device.

In a possible implementation, the first time period includes a time period from a moment that is after an end moment corresponding to the first resource after a third delay to a start moment of the second PDCCH, the third delay is a sum of a sixth time amount and a first delay, and the first delay is a round-trip delay between the second communication apparatus and the first communication apparatus.

In the foregoing manner, it is directly specified that the terminal device monitors the second DCI within a fixed time, so as to further reduce power consumption of the terminal device.

In a possible implementation, a start moment and an end moment of the first time period or the second time period are predefined, and a time interval between the end moment of the first PDCCH and the start moment of the second PDCCH is predefined.

In the foregoing manner, it is directly specified that the terminal device monitors the second DCI within a fixed time, so as to further reduce power consumption of the terminal device. For example, it may be agreed that after receiving two ACKs/NACKs, the network device delivers two PDCCHs at specified time points, including start time of the two PDCCHs and an interval between the two PDCCHs. The terminal device monitors the PDCCH within a corresponding time according to regulations, so that duration for monitoring the PDCCH can be further reduced.

S130: The first communication apparatus monitors the second PDCCH.

The first communication apparatus monitors the second PDCCH based on the first time period or the second time period.

The following describes the method 100 in detail with reference to a specific data transmission manner. It should be noted that in the following embodiments, an example in which a "subframe" is used as a transmission time unit is used for description. It should be understood that this application is not limited to that a "subframe" is used as a transmission time unit, and a slot, a symbol, a millisecond, a sampling interval, or the like may also be used as a transmission time unit.

Figure 4:
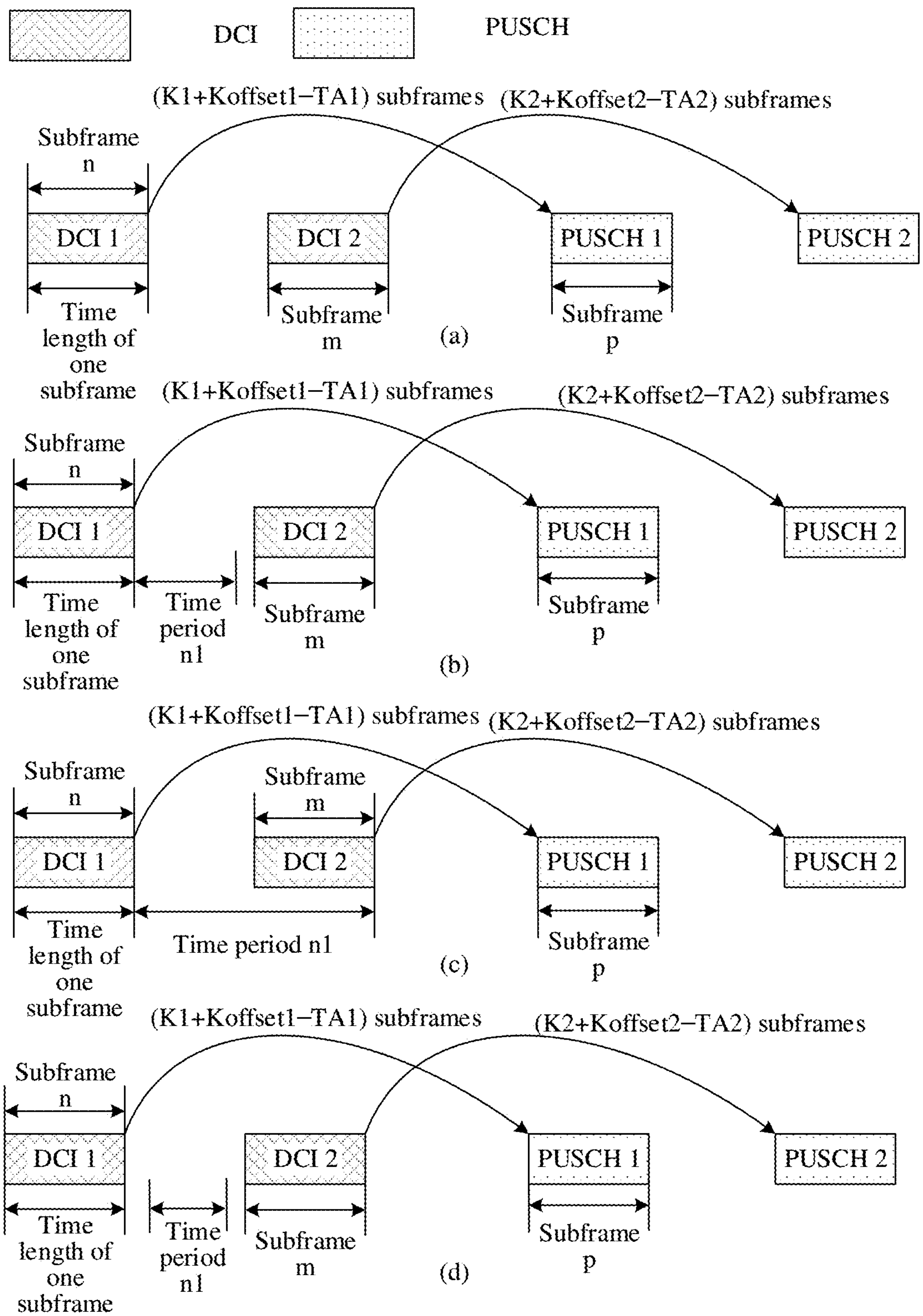
FIG. 4 is a schematic diagram of an example of a data transmission method according to an embodiment of this application.

This application provides an example of a data transmission method. As shown in FIG. 4, FIG. 4 is a schematic diagram of an example of a data transmission method according to an embodiment of this application. In a scenario shown in FIG. 4, UE first receives two pieces of DCI, and then sends physical uplink shared channel (PUSCH) data scheduled by using the two pieces of DCI.

Figure 5:
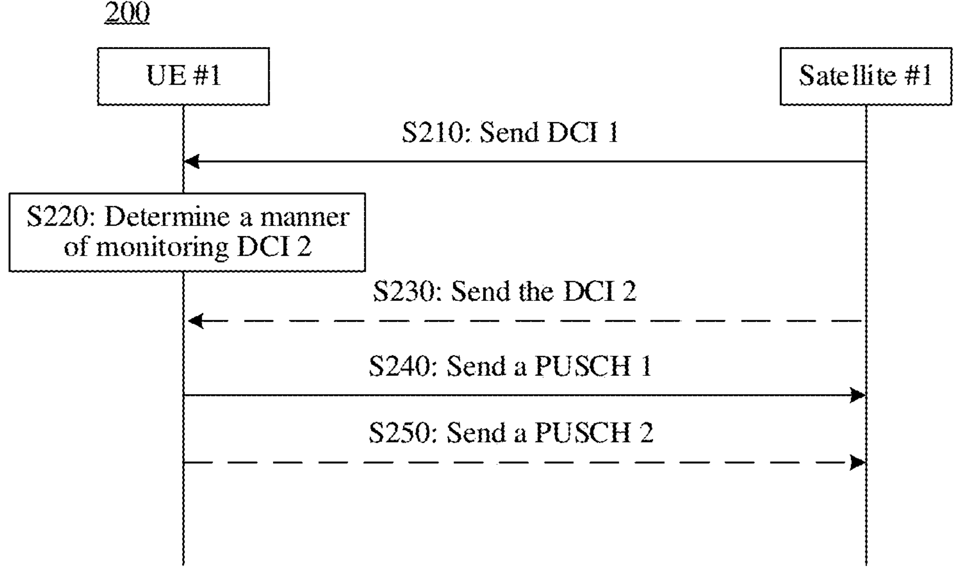
FIG. 5 is a schematic diagram of another example of a data transmission method according to an embodiment of this application.

For example, as shown in (a) in FIG. 4, it is assumed that a quantity of processes is 2, one piece of DCI can be used to schedule only one transmit block (TB). The UE needs to first receive two pieces of DCI, which are DCI 1 and DCI 2 respectively. Uplink data PUSCH 1 scheduled by using the DCI 1 is transmitted in a subframe (n+K1+Koffset1), and the UE sends the PUSCH 1 ahead of TA1. Uplink data PUSCH 2 scheduled by using the DCI 2 is transmitted in a subframe (m+K2+Koffset2), and the UE sends the PUSCH 2 ahead of TA2. K1, K2, Koffset1, Koffset2, TA1, and TA2 are positive integers greater than or equal to 0, and K1, K2, Koffset1, Koffset2, TA1, and TA2 conform to the foregoing descriptions of K, Koffset, and TA. A unit of TA (TA1 and TA2) needs to be converted to be the same as a unit of K and Koffset. If an interval of K1+Koffset1−TA1 is large, the DCI 2 is allowed to be inserted. For the foregoing scenario, the data transmission method designed in this embodiment of this application is shown in a method 200 in FIG. 5. FIG. 5 is a schematic diagram of another example of a data transmission method according to an embodiment of this application.

S210: A network device #1 (the network device #1 means a network device, and for other similar expressions, refer to the explanation herein) sends DCI 1, and UE #1 receives the DCI 1 in a subframe n, where the DCI 1 is used to schedule a transmission resource of uplink data PUSCH 1.

S220: The UE #1 determines a manner of monitoring DCI 2, where the DCI 2 is used to schedule a transmission resource of uplink data PUSCH 2.

The UE #1 determines, based on at least one of a first size relationship and a second size relationship, the manner of monitoring the DCI 2. The first size relationship is a relationship between a size of K1+Koffset1−TA1 and a threshold #1, and the second size relationship is a relationship between the size of K1+Koffset1−TA1 and a threshold #2. The threshold #1 and the threshold #2 are greater than 0, the threshold #2 is greater than the threshold #1, and values of the threshold #1 and the threshold #2 may be predefined, may be agreed on in a protocol, may be configured by the network device for the UE #1 by using radio resource control (RRC) signaling, or may be calculated by the UE #1 based on duration (or a quantity of repetitions) of uplink data or downlink data. For example, if duration of the DCI 1 is one subframe, the threshold #1 is 1+2=3, and the threshold #2 is 1+5=6, that is, the values of the threshold #1 and the threshold #2 are determined by adding a value to the duration of the DCI 1. If a quantity of repetitions of the DCI 1 is 2, the threshold #1 is 2*1=2, and the threshold #2 is 2*3=6, that is, the values of the threshold #1 and the threshold #2 are determined by multiplying the duration of the DCI 1 by a value. A manner of calculation based on the duration (or the quantity of repetitions) of the uplink data is similar, and details are not described herein again. For determining the threshold #1 and the threshold #2 according to another calculation method, refer to the foregoing content. Details are not described herein again. It should be noted that the threshold #1 and the threshold #2 are described by using a quantity of subframes as an example in this application. The threshold #1 and the threshold #2 may alternatively be a quantity of slots, a quantity of symbols, a quantity of milliseconds, a quantity of sampling intervals, or the like, which is finally converted into a quantity of subframes for calculation. Details are not described in this application.

The UE #1 determines, based on at least one of the first size relationship and the second size relationship, the manner of monitoring the DCI 2, and there are the several following manners of monitoring the DCI 2.

Manner a

If the size of K1+Koffset1−TA1 is less than or equal to the threshold #1, the UE #1 does not monitor the DCI 2 (that is, does not monitor a PDCCH corresponding to the DCI 2) between an end moment of the subframe n and a start moment of a subframe p, and the network device #1 does not schedule the DCI 2 (that is, a PDCCH corresponding to the DCI 2) within the time.

In a possible implementation, the UE #1 starts to monitor the DCI 2 at an end moment of the subframe p until the DCI 2 is received.

Manner b

If the size of K1+Koffset1−TA1 is greater than the threshold #1 and is less than or equal to the threshold #2, the UE #1 monitors the DCI 2 between an end moment of the subframe n and a start moment of a subframe (n+K1+Koffset1−TA1−1), that is, monitors the DCI 2 between an end moment at which the DCI 1 is received and a start moment of a previous subframe of sending the PUSCH 1, and the network device #1 may schedule the PDCCH within the time.

In this application, for a terminal device, scheduling a PDCCH indicates scheduling the PDCCH to the terminal device for transmission. Therefore, the PDCCH needs to be sent to the terminal device, which is referred to as scheduling a PDCCH for short without affecting context understanding. Correspondingly, skipping scheduling a PDCCH indicates that the PDCCH is not sent to the terminal device.

Manner c

If the size of K1+Koffset1−TA1 is greater than the threshold #2, the UE #1 does not monitor the DCI 2 between the end moment of the subframe n and an end moment of a time period n1, the network device #1 does not schedule the PDCCH within the time, the UE #1 monitors the DCI 2 between the end moment of the time period n1 and the start moment of n+K1+Koffset1−TA1−1, and the network device #1 may schedule the PDCCH within the time. As shown in (b) in FIG. 4, a start moment of the time period n1 is the end moment of the subframe n, and the end moment of the time period n1 is earlier than the start moment of the subframe p, or the end moment of the time period n1 is the start moment of the time period n1 plus duration of the time period n1. For determining the duration of the time period n1, refer to the manner of determining the threshold #1 or the threshold #2, and details are not described herein again.

Alternatively, if the value of K1+Koffset1−TA1 is greater than the threshold #2, the UE #1 monitors the DCI 2 between the end moment of the subframe n and an end moment of a time period n1, and the network device #1 may schedule the PDCCH within the time. If the UE #1 receives the DCI 2 between the end moment of the subframe n and the end moment of the time period n1, the UE #1 does not monitor the PDCCH between a start moment of a subframe m and the start moment of the subframe p. If the UE #1 does not receive the DCI 2 between the end moment of the subframe n and the end moment of the time period n1, the UE #1 does not monitor the PDCCH between the end moment of the time period n1 and a start moment at which the uplink data PUSCH 1 is sent, and the network device #1 does not schedule the PDCCH within the time. As shown in (c) in FIG. 5, the start moment of the time period n1 is the end moment of the subframe n.

Alternatively, if the value of K1+Koffset1−TA1 is greater than the threshold #2, the UE #1 monitors the DCI 2 between a start moment of a time period n1 and an end moment of the time period n1, and does not monitor the DCI 2 within another time interval, and the network device #1 may also schedule the PDCCH only within the time, and does not schedule the PDCCH within another time interval.

S230: The network device #1 sends the DCI 2, and the UE #1 monitors the DCI 2 in one of the foregoing manners and receives the DCI 2 in a subframe m.

S240: The UE #1 sends the PUSCH 1 ahead of TA1, and the network device receives the PUSCH 1 in a subframe (n+K1+Koffset1).

In a possible implementation, S250: The UE #1 sends the PUSCH 2 ahead of TA2, and the network device receives the PUSCH 2 in a subframe (m+K1+Koffset1).

In the scenario shown in FIG. 4, by using the method 200, the UE is enabled to determine, based on an interval between a PDCCH and uplink data scheduled by using the PDCCH, whether to monitor the PDCCH, and if the UE monitors the PDCCH, the UE monitors the PDCCH in a specific monitoring manner, so as to shorten monitoring duration and reduce power consumption of the terminal.

Figure 6:
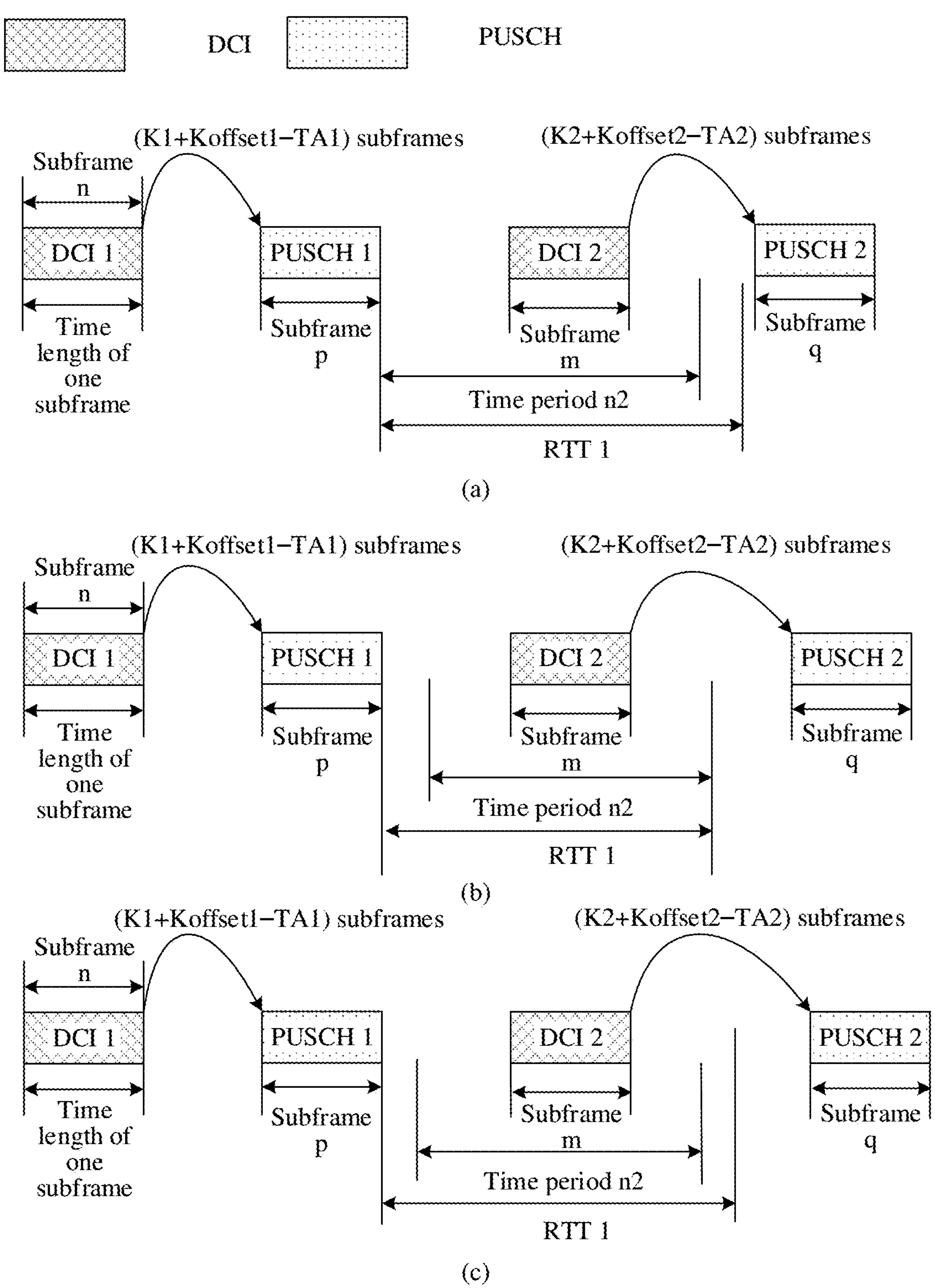
FIG. 6 is a schematic diagram of still another example of data transmission method according to an embodiment of this application.

This application further provides another example of a data transmission method. As shown in FIG. 6, FIG. 6 is a schematic diagram of still another example of data transmission method according to an embodiment of this application. In a scenario shown in FIG. 6, the UE first receives a first piece of DCI, and then sends PUSCH data scheduled by using the first piece of DCI. Then, the UE receives a second piece of DCI, and then sends PUSCH data scheduled by using the second piece of DCI, where the first piece of DCI and the second piece of DCI are respectively located in two processes. In this scenario, the UE does not receive, within a round-trip delay (RTT) time after sending the PUSCH data scheduled by using the first piece of DCI, DCI (the DCI is used to schedule subsequent new data or schedule retransmitted PUSCH data scheduled by using the first piece of DCI, for example, the DCI includes a new data indicator (NDI)) that is of the PUSCH data scheduled by using the first piece of DCI and that is from the network device (for example, a satellite). Within the RTT time, the UE needs to monitor a PDCCH from a second process. Because an RTT of communication by the network device is long, if the UE always monitors whether DCI corresponding to the PDCCH in the second process exists within the RTT time, high power consumption is caused.

For the foregoing scenario, the data transmission method designed in this embodiment of this application is a method 300. The following provides a description with reference to FIG. 6. S310: A network device #1 sends DCI 1, and UE #1 receives DCI in a first process, that is, the DCI 1, in a subframe n, where the DCI 1 is used to schedule a transmission resource of uplink data PUSCH 1.

S320: The UE #1 determines a manner of monitoring DCI 2.

The UE #1 determines a time period n2 in the foregoing data scheduling manner. The UE #1 monitors DCI in a second process, that is, the DCI 2, only in the time period n2, where the DCI 2 is used to schedule a transmission resource of uplink data PUSCH 2. The network device schedules a PDCCH only in the time period n2. The time period n2 is determined in the following several manners.

Manner d

As shown in (a) in FIG. 6, a start moment of the time period n2 is an end moment of a subframe p, and an end moment of the time period n2 is less than or equal to an end moment of an RTT 1. The subframe p is a subframe used by the UE #1 to send the uplink data PUSCH 1 scheduled by using the DCI 1, a start moment of the RTT 1 time period is the end moment of the subframe p, and duration of the RTT 1 time period is a round-trip delay between the UE #1 and the network device #1. In other words, starting from the end moment of the RTT 1, the UE #1 needs to monitor feedback DCI corresponding to the uplink data PUSCH 1. Therefore, the UE #1 may first determine maximum monitoring duration t, where t is greater than or equal to 0, the end moment of the time period n2 is the start moment of the time period n2 plus t, and the end moment of the time period n2 is earlier than a start moment of a subframe q. The maximum monitoring duration t may be agreed on in a protocol, or may be configured by the network device by using RRC signaling, or may be preconfigured in the UE #1, or may be calculated by the UE #1 based on duration (or a quantity of repetitions) of uplink data or downlink data. Specific content is similar to the manner of calculating the threshold #1 or the threshold #2 in the method 200. Details are not described herein again. In the manner, after sending the uplink data PUSCH 1, the UE #1 starts to monitor the DCI in the second process, that is, the DCI 2, from the start moment of n2 to the end moment of the time period n2, and the network device may schedule the PDCCH in the time period n2. The UE #1 does not monitor the DCI 2 from the end moment of the time period n2 to the end moment of the RTT 1, and the network device does not schedule the PDCCH.

Manner e

As shown in (b) in FIG. 6, a start moment of the time period n2 is greater than an end moment of a subframe p, and an end moment of the time period n2 is an end moment of an RTT 1. For descriptions of the subframe p and the RTT 1, refer to the descriptions in the manner d, and details are not described herein again. Starting from the end moment of the RTT 1, the UE #1 needs to monitor feedback DCI corresponding to the uplink data PUSCH 1. Therefore, the UE #1 may first determine maximum monitoring duration t, and the start moment of the time period n2 is obtained by subtracting t from the end moment of the time period n2. For a manner of determining the maximum monitoring duration t, refer to the foregoing manner d. Details are not described herein again. In the manner, after sending the uplink data PUSCH 1, the UE #1 does not monitor the DCI 2 before the start moment of the time period n2, and the network device does not schedule the PDCCH. In the time period n2, the UE #1 monitors the DCI 2, and the network device may schedule the PDCCH.

Manner f

As shown in (c) in FIG. 6, a start moment of the time period n2 is greater than an end moment of a subframe p, and an end moment of the time period n2 is less than an end moment of an RTT 1, that is, the time period n2 is located between the end moment of the subframe p and the end moment of the RTT 1. For descriptions of the subframe p and the RTT 1, refer to the descriptions in the manner d, and details are not described herein again. Starting from the end moment of the RTT 1, the UE #1 needs to monitor feedback DCI corresponding to the uplink data PUSCH 1. Therefore, the UE #1 may first determine any two or three of the start moment of the time period n2, the end moment of the time period n2, and maximum monitoring duration t, to determine the time period n2. For example, the end moment of the time period n2 may be obtained by adding the start moment of the time period n2 and the maximum monitoring duration t. For another example, the time period n2 may be determined based on the start moment of the time period n2 and the end moment of the time period n2. For another example, the start moment of the time period n2 may be obtained by subtracting the maximum monitoring duration t from the end moment of the time period n2. For a manner of determining the start moment of the time period n2, the end moment of the time period n2, and a value of the maximum monitoring duration t, refer to the foregoing manner d. Details are not described herein again. In the manner, after sending the uplink data PUSCH 1, the UE #1 monitors the DCI 2 only in the time period n2 before the end moment of the RTT 1, and the network device may schedule the PDCCH in the time period n2.

S330: The UE #1 sends uplink data PUSCH 1 ahead of TA1 (for example, sends the PUSCH 1 in the subframe p in FIG. 6), and the network device #1 receives the uplink data PUSCH 1 in a subframe (n+K1+Koffset1).

S340: The UE #1 monitors the DCI 2 in one of the foregoing manners, and receives the DCI 2 in a subframe m.

S350: The UE #1 sends uplink data PUSCH 2 ahead of TA2 (for example, sends the PUSCH 2 in the subframe q in FIG. 6), and the network device #1 receives the uplink data PUSCH 2 in a subframe (m+K2+Koffset2).

In the scenario shown in FIG. 6, by using the method 300, the UE is enabled to monitor DCI only in a period of time, and does not monitor the DCI within another time interval. This can reduce monitoring duration and reduce power consumption of the UE.

In this embodiment of this application, a manner of monitoring, by the UE, feedback DCI corresponding to the uplink data after the UE sends two pieces of uplink data based on scheduling of two pieces of DCI is further considered. It is assumed that the UE sends the uplink data PUSCH 1 based on scheduling of the DCI in the first process, that is, scheduling of the DCI 1, and sends the uplink data PUSCH 2 based on the DCI in the second process, that is, scheduling of the DCI 2, a time interval between an end moment at which the uplink data PUSCH 1 is sent and a start moment at which the uplink data PUSCH 2 is sent is Toffset (a transmission time unit of Toffset may be a slot, a subframe, a symbol, a sampling interval, or the like. In this application, an example in which Toffset is a quantity of subframes is used for description, and this is not limited thereto). In a communication system of the network device, Koffset is large, resulting in a large time interval between the DCI 1 and the DCI 2. Consequently, Toffset is large. In this case, a time interval between receiving the uplink data PUSCH 1 and receiving the uplink data PUSCH 2 by the network device (for example, a satellite) is also large. The network device may send feedback DCI of the PUSCH 1 after an end moment at which the uplink data PUSCH 1 is received and before a start moment at which the PUSCH 2 is received. In other words, the network device delivers the feedback DCI corresponding to the first piece of PUSCH data in the middle of receiving the two pieces of PUSCH data. In this case, the UE needs to monitor the PDCCH after the end moment at which the PUSCH 1 is sent and after an RTT time. However, if Toffset is small, the network device delivers the feedback DCI of the PUSCH 1 only after receiving the PUSCH 2. In this case, the UE needs to monitor the PDCCH after the end moment at which the PUSCH 2 is sent and after the RTT time.

Figure 7:
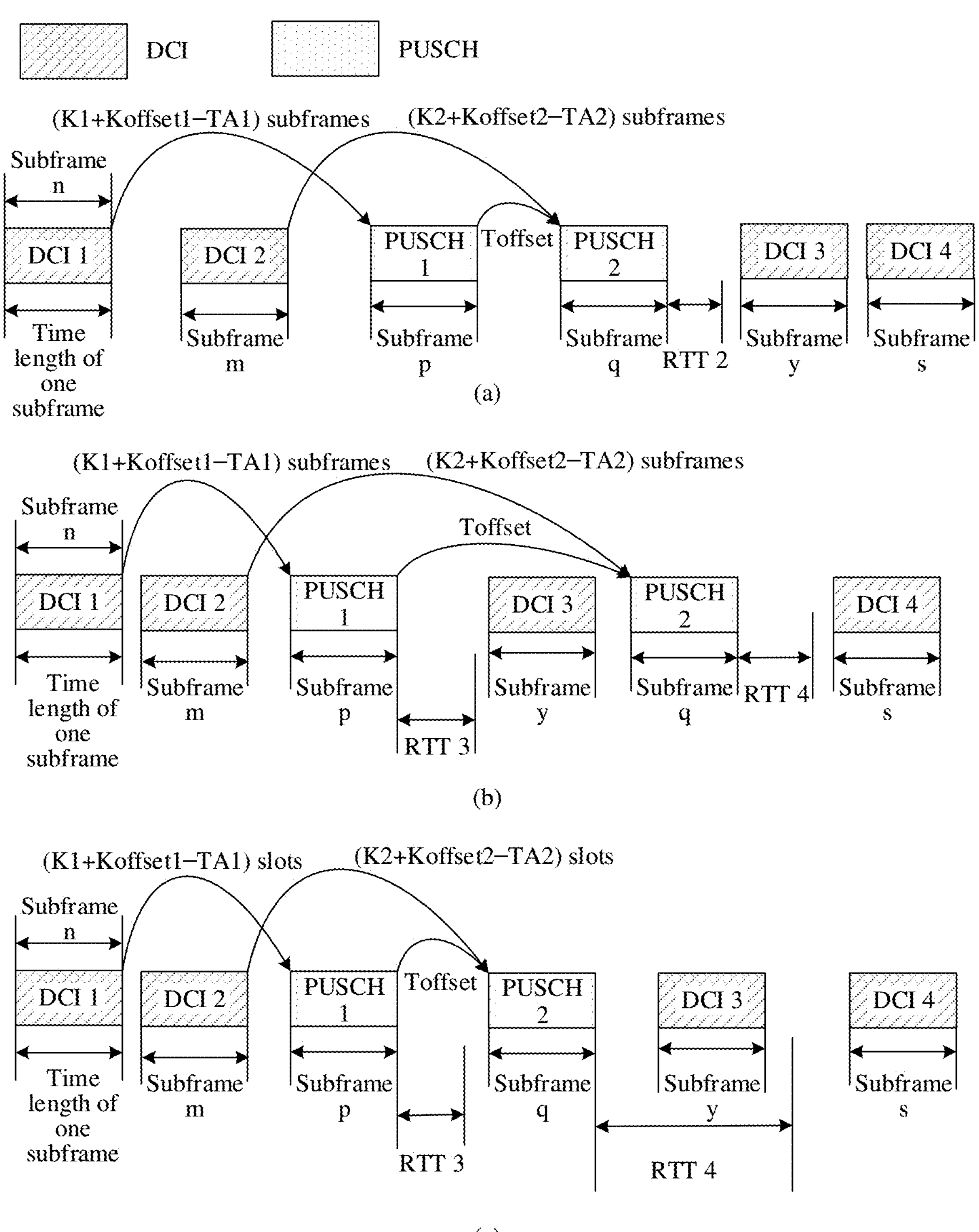
FIG. 7 is a schematic diagram of still another example of data transmission method according to an embodiment of this application.

For the foregoing scenario, the data transmission method designed in this embodiment of this application is a method 400. The following provides a description with reference to FIG. 7. FIG. 7 is a schematic diagram of still another example of a data transmission method according to an embodiment of this application. S410: A network device #1 sends DCI (that is, DCI 1) in a first process and DCI (that is, DCI 2) in a second process, and UE #1 receives the DCI 1 in a subframe n, and receives the DCI 2 in a subframe m.

S420: The UE #1 determines a manner of monitoring feedback DCI corresponding to each of uplink data PUSCH 1 and uplink data PUSCH 2 that need to be sent. A transmission resource of the uplink data PUSCH 1 is scheduled by using the DCI 1, and a transmission resource of the uplink data PUSCH 2 is scheduled by using the DCI 2 (in other words, the DCI 1 is used to schedule the uplink data PUSCH 1, and the DCI 2 is used to schedule the uplink data PUSCH 2).

The UE #1 determines, based on a size relationship between a time interval between the uplink data PUSCH 1 and the uplink data PUSCH 2 and a threshold #3, the manner of monitoring the feedback DCI corresponding to each of the two pieces of uplink data. For a manner of determining the threshold #3, refer to the manner of determining the threshold #1 or the threshold #2 in the method 200. Details are not described herein again in this application. The UE #1 determines the manner of monitoring the feedback DCI corresponding to each of the two pieces of uplink data, and there are the several following manners.

Manner g

If Toffset is less than or equal to the threshold #3, the UE #1 starts to monitor DCI 3 and DCI 4 from an end moment of an RTT 2, and the network device #1 sends the DCI 3 and the DCI 4 after receiving the uplink data PUSCH 2, as shown in (a) in FIG. 7. The DCI 3 is feedback DCI sent by the network device for the uplink data PUSCH 1, for example, an NDI included in the DCI. The DCI 4 is feedback DCI sent by the network device for the uplink data PUSCH 2, for example, an NDI included in the DCI. A start moment of the RTT 2 time period is an end moment of a subframe q, the end moment of the RTT 2 is earlier than or equal to a start moment of a subframe y, duration of the RTT 2 is a round-trip delay between the UE #1 and the network device #1, and the end moment of the RTT 2 is the start moment of the RTT 2 time period plus the duration of the RTT 2.

Manner h

If Toffset is greater than the threshold #3, the UE #1 starts to monitor the DCI 3 from an end moment of an RTT 3, and the network device sends the DCI 3 after receiving the uplink data PUSCH 1. A start moment of the RTT 3 is an end moment of a subframe p, the end moment of the RTT 3 is earlier than or equal to a start moment of a subframe y, duration of the RTT 3 is a round-trip delay between the UE #1 and the network device #1, and the end moment of the RTT 3 is the start moment of the RTT 3 time period plus the duration of the RTT 3.

Manner i

Based on the manner h, the UE #1 may receive the DCI 3 before a start moment of a subframe q, or may receive the DCI 3 after an end moment of a subframe q. If the DCI 3 is received between the end moment of the RTT 3 and the start moment of the subframe q, the UE #1 does not monitor the DCI 4 from an end moment of the subframe y to an end moment of an RTT 4. A start moment of the RTT 4 is the end moment of the subframe q, the end moment of the RTT 4 is earlier than or equal to a start moment of a subframe s, duration of the RTT 4 is a round-trip delay between the UE #1 and the network device #1, and the end moment of the RTT 4 is the start moment of the RTT 3 time period plus the duration of the RTT 4. Because only after the UE #1 sends the PUSCH 2 and after the round-trip delay, the UE #1 may receive the DCI 4, and the UE #1 monitors the DCI 4 after the end moment of the RTT 4, as shown in (b) in FIG. 7. If the DCI 3 is not received between the end moment of the RTT 3 and the start moment of the subframe q, the UE #1 starts to monitor the DCI 3 after the end moment of the subframe q, and starts to monitor the DCI 4 after the end moment of the RTT 4, as shown in (c) in FIG. 7.

S430: The UE #1 sends the uplink data PUSCH 1 ahead of TA1 (for example, the PUSCH 1 is sent in the subframe p in FIG. 7), the network device #1 receives the uplink data PUSCH 1 in a subframe (n+K1+Koffset1), the network device #1 sends DCI 3 after receiving the uplink data PUSCH 1, and the UE #1 monitors the DCI 3 in one of the foregoing manners obtained through determining, and receives the DCI 3 in a subframe y.

S440: The UE #1 sends the uplink data PUSCH 2 ahead of TA2 (for example, the PUSCH 2 is sent in the subframe q in FIG. 7), the network device #1 receives the uplink data PUSCH 2 in a subframe (m+K2+Koffset2), the network device #1 sends DCI 4 after receiving the uplink data PUSCH 2, and the UE #1 monitors the DCI 4 in one of the foregoing manners obtained through determining, and receives the DCI 4 in a subframe s.

In the scenario shown in FIG. 7, by using the method 400, the UE is enabled to monitor DCI only in a period of time, and does not monitor the DCI within another time interval. This can reduce monitoring duration and reduce power consumption of the UE.

In this embodiment of this application, after the DCI sent by the network device is used to schedule downlink data and is further used to schedule uplink data that corresponds to the PDSCH data and that is fed back by the UE performing an ACK/a NACK, a manner in which the UE monitors subsequent DCI is further considered. The uplink data fed back through the ACK/the NACK is sent through an uplink data channel. For example, in the following scenario, when receiving downlink data PDSCH 1 scheduled by using DCI (that is, DCI 1) in a first process, the UE performs ACK/a NACK feedback. If an ACK is fed back, after receiving the ACK, the network device delivers DCI to schedule new data. If a NACK is fed back, after receiving the NACK, the network device delivers DCI to perform retransmission scheduling on the PDSCH 1. Therefore, after sending the ACK/the NACK corresponding to the PDSCH 1, the UE may monitor the DCI at the earliest after an RTT, and may monitor a PDCCH at the latest after receiving downlink data PDSCH 2 scheduled by using DCI in a second process and after an RTT.

Figure 8:
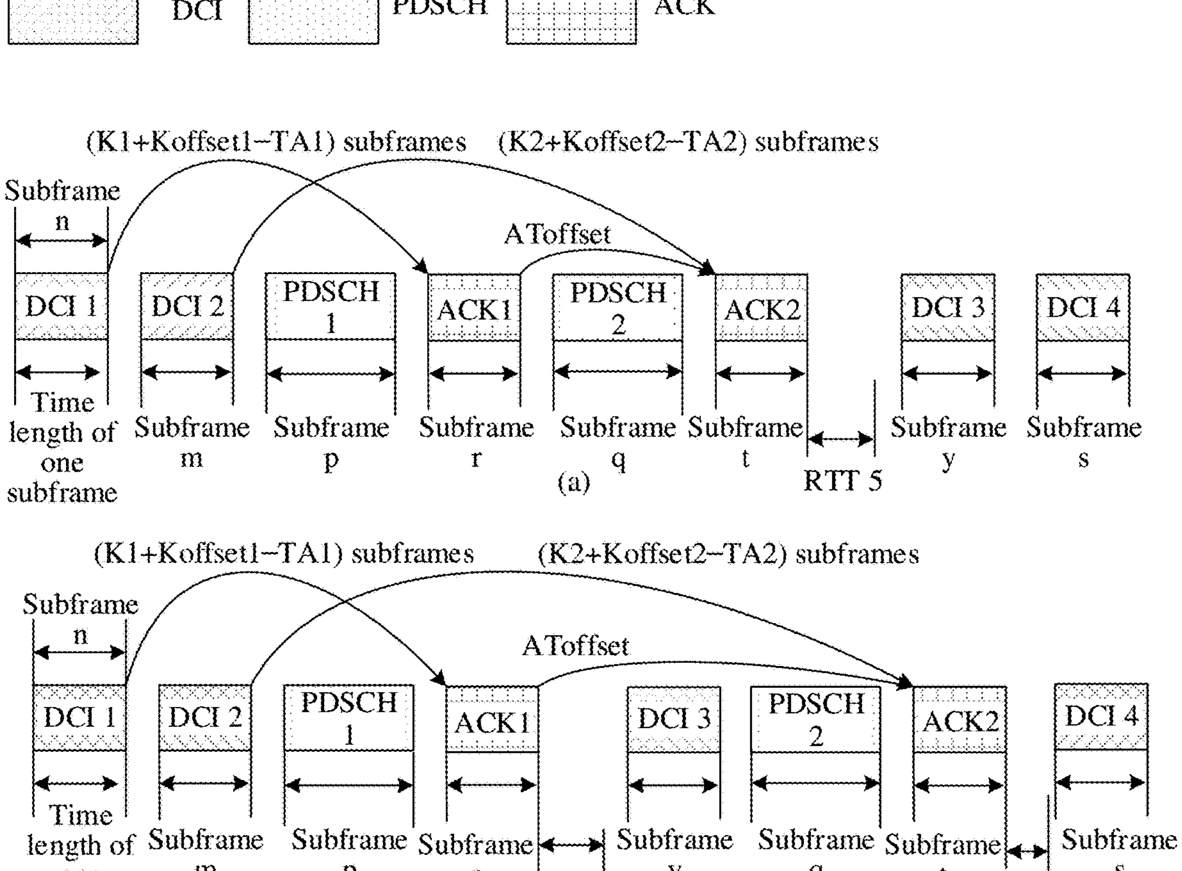
FIG. 8 is a schematic diagram of still another example of data transmission method according to an embodiment of this application.

For the foregoing scenario, the data transmission method designed in this embodiment of this application is a method 500. The following provides a description with reference to FIG. 8. FIG. 8 is a schematic diagram of still another example of a data transmission method according to an embodiment of this application. S510: A network device #1 sends DCI (that is, DCI 1) in a first process and DCI (that is, DCI 2) in a second process, and UE #1 receives the DCI 1 in a subframe n, and receives the DCI 2 in a subframe m. The DCI 1 is used to schedule downlink data PDSCH 1 sent by the network device #1 and a resource of an ACK 1/a NACK 1 sent by the UE #1 for the PDSCH 1, and the DCI 2 is used to schedule downlink data PDSCH 2 sent by the network device #1 and a resource of an ACK 2/a NACK 2 sent by the UE #1 for the PDSCH 2.

S520: The network device #1 sends the PDSCH 1 and the PDSCH 2, the UE #1 receives the PDSCH 1 in a subframe p, and the UE #1 sends uplink data ACK 1 ahead of TA1 (for example, sends the ACK 1 in a subframe r in FIG. 8). Correspondingly, the network device #1 receives the ACK 1 in a subframe (n+K1+Koffset1), and sends the PDSCH 2 in a subframe q, and the UE #1 sends uplink data ACK 2 ahead of TA2 (for example, sends the ACK 2 in a subframe t in FIG. 8). Correspondingly, the network device #1 receives the ACK 2 in a subframe (m+K2+Koffset2).

S530: The UE #1 determines a manner of monitoring DCI 3 fed back by the network device for the ACK 1/the NACK 1 and a manner of monitoring DCI 4 fed back by the network device for the ACK 2/the NACK 2. The following uses the ACK 1 and the ACK 2 as an example for description. A time at which the UE #1 sends the ACK 1 is earlier than a time at which the UE #1 sends the ACK 2, that is, a time at which the network device #1 receives the ACK 1 is earlier than a time at which the network device #1 receives the ACK 2.

The UE #1 determines the manners of monitoring the DCI 3 and the DCI 4 based on a relationship between a time interval AToffset between the ACK 1 and the ACK 2 and a threshold #4. For a description of a time unit of AToffset, refer to the description of Toffset. Details are not described herein again. AToffset is an integer greater than or equal to 0. For a manner of determining the threshold #4, refer to the manner of determining the threshold #1 or the threshold #2 in the method 200. Details are not described herein again in this application. The UE #1 determines the manner of monitoring the feedback DCI corresponding to each of the two pieces of uplink data, and there are the several following manners.

Manner j

If AToffset is less than or equal to the threshold #4, a time interval between receiving the ACK 1 and receiving the ACK 2 by the network device #1 is also less than or equal to the threshold #4. In this case, the network device #1 sends the DCI 3 and the DCI 4 after receiving the ACK 1 and the ACK 2, and the UE #1 starts to monitor the DCI 3 and the DCI 4 after sending the ACK 2.

The UE #1 starts to monitor the DCI 3 and the DCI 4 only after an end moment of an RTT 5 time period, as shown in (a) in FIG. 8. A start moment of the RTT 5 time period is an end moment of a subframe t, the end moment of the RTT 5 time period is earlier than or equal to a start moment of a subframe y, duration of the RTT 5 is a round-trip delay between the UE #1 and the network device #1, and the end moment of the RTT 5 is the start moment of the RTT 5 time period plus the duration of the RTT 5.

Manner k

If AToffset is greater than the threshold #4, the time interval between receiving the ACK 1 and receiving the ACK 2 by the network device #1 is also greater than the threshold #4. In this case, the network device #1 may deliver the DCI 3 corresponding to the ACK 1 after receiving the ACK 1, and the UE #1 starts to monitor the DCI 3 after sending the ACK 1, and starts to monitor the DCI 4 after sending the ACK 2.

The UE #1 starts to monitor the DCI 3 after an end moment of an RTT 6 time period, and starts to monitor the DCI 4 from the end moment of the RTT 5, as shown in (b) in FIG. 8. A start moment of the RTT 6 time period is an end moment of a subframe r, the end moment of the RTT 6 time period is earlier than or equal to an end moment of a subframe y, duration of the RTT 6 is a round-trip delay between the UE #1 and the network device #1, and the end moment of the RTT 6 is the start moment of the RTT 5 time period plus the duration of the RTT 6.

Manner m

Based on the manner k, if the UE #1 receives the DCI 3 after the end moment of the RTT 6 and before the end moment of the RTT 5, the UE #1 does not monitor the DCI 4 between the end moment of the subframe y and the end moment of the RTT 5, and starts to monitor the DCI 4 after the end moment of the RTT 5, as shown in (b) in FIG. 8.

S540: The network device #1 sends the DCI 3 and the DCI 4, and the UE #1 monitors the DCI 3 and the DCI 4 in one of the foregoing manners obtained through determining, receives the DCI 3 in a subframe y, and receives the DCI 4 in a subframe s.

In the scenario shown in FIG. 8, by using the method 500, the UE is enabled to determine, based on a relationship between an interval between two ACKs/NACKs fed back by the network device and a threshold, a manner of monitoring DCI and a manner of skipping monitoring DCI, so that monitoring duration can be reduced, and power consumption of the UE can be reduced.

It should be noted that, in the foregoing embodiments, a manner in which the network device #1 schedules the DCI 2 corresponds to a manner in which the UE #1 monitors the DCI 2, that is, both the manner in which the network device #1 schedules the DCI 2 and the manner in which the UE #1 monitors the DCI 2 are determined according to the foregoing rule.

In embodiments of the method 200 to the method 500, the UE determines, through determining, the manner of monitoring the DCI. This application further provides an embodiment in which the network device (for example, a satellite) directly specifies, for the foregoing different scenarios, a manner in which the UE monitors the DCI.

Figure 9:
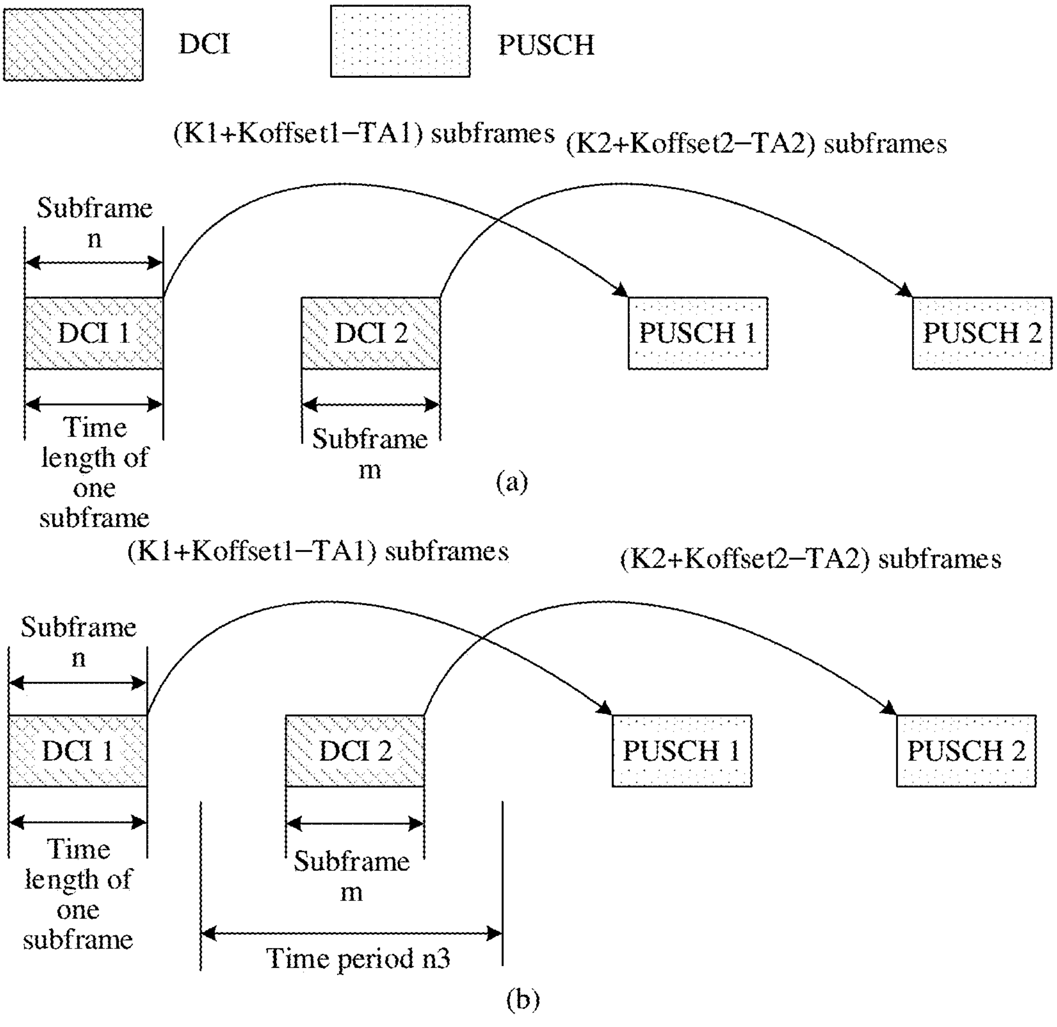
FIG. 9 is a schematic diagram of still another example of data transmission method according to an embodiment of this application.

Corresponding to the scenario in the method 200, this application further provides a data transmission method 600. The following provides a description with reference to FIG. 9. FIG. 9 is a schematic diagram of still another example of a data transmission method according to an embodiment of this application.

S610: A network device #1 sends DCI 1, and UE #1 receives the DCI 1 in a subframe n, where the DCI 1 is used to schedule a transmission resource of uplink data PUSCH 1.

S620: The network device #1 determines a manner in which the UE #1 monitors DCI 2.

The network device #1 determines, by specifying a size of K1+Koffset1, the manner in which the UE #1 monitors the DCI 2, and there are the several following manners.

Manner a1

The network device #1 specifies that K1+Koffset1 is less than or equal to a threshold #5, and the UE #1 always monitors the DCI 2 after an end moment of the subframe n and before a previous subframe of sending the PUSCH 1 (for example, as shown in (a) in FIG. 9, the UE #1 always monitors the DCI 2 from the end moment of the subframe n to a start moment of a subframe (n+K1+Koffset1−TA1−1)), that is, the network device #1 schedules, within the time, a PDCCH corresponding to the DCI 2, as shown in (a) in FIG. 9. For a value of the threshold #5, refer to a manner of obtaining a value of the threshold #1 or the threshold #2 in the method 200. Details are not described herein again.

Manner a2

The network device #1 specifies that K1+Koffset1 is greater than the threshold #5, and determines a time period n3. The UE #1 monitors the DCI 2 only in the time period n3, and does not monitor the DCI 2 in another time period. That is, the network device #1 schedules, only in the time period n3, the PDCCH corresponding to the DCI 2, as shown in (b) in FIG. 9. A start moment of the time period n3 is greater than or equal to (not earlier than) the end moment of the subframe n, and an end moment of the time period n3 is less than or equal to (not later than) the start moment of the subframe (n+K1+Koffset1−TA1−1).

The network device #1 may notify, by using RRC signaling, the UE #1 of the manner of monitoring the DCI, or the foregoing manner may be pre-configured in the network device and the UE, the network device only needs to notify the UE of an index, and the UE finds a corresponding manner of monitoring the DCI based on the index.

S630: The network device #1 schedules and sends the DCI 2 in one of the foregoing manners as specified, and the UE #1 correspondingly monitors the DCI 2, and receives the DCI 2 in a subframe m. The UE #1 sends uplink data PUSCH 1 ahead of TA1, and the network device correspondingly receives the uplink data PUSCH 1 in a subframe (n+K1+Koffset1). The UE #1 sends uplink data PUSCH 2 ahead of TA2, and the network device correspondingly receives the uplink data PUSCH 2 in a subframe (m+K2+Koffset2), where a transmission resource of the uplink data PUSCH 2 is scheduled by using the DCI 2.

It should be understood that a size of K1+Koffset1 may alternatively be agreed on in a protocol, and the network device #1 and the UE #1 schedule or monitor DCI in the foregoing manner agreed on in the protocol.

In the scenario shown in FIG. 9, by using the method 600, the network device is enabled to directly specify K1+Koffset1, and determine the manner in which the UE monitors the DCI and the manner in which the UE does not monitor the DCI, so that monitoring duration can be reduced, and power consumption of the UE can be reduced.

Corresponding to the scenario in the method 300, this application further provides a data transmission method 700. The following provides a description with reference to FIG.

Figures 10, 11:
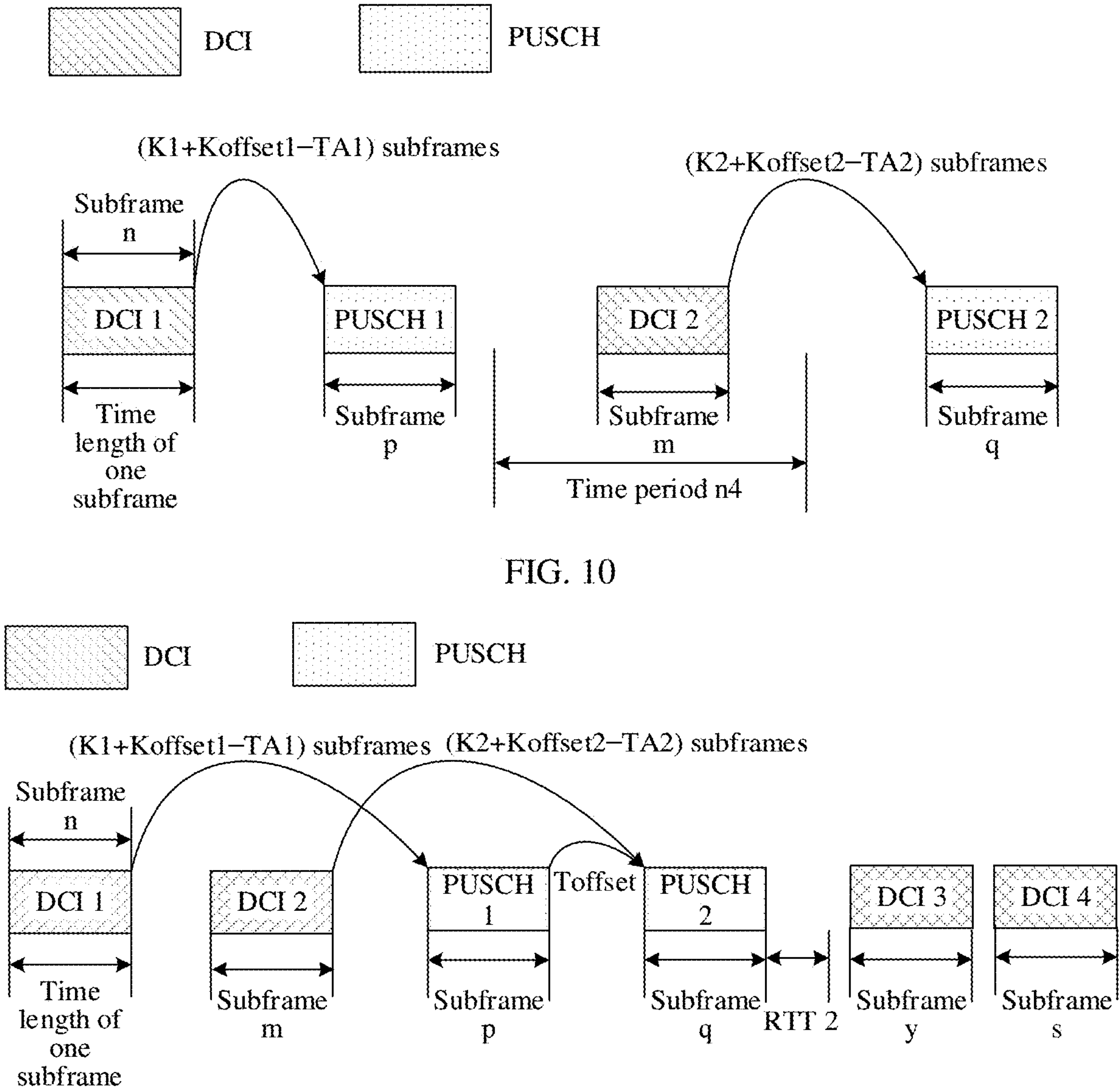
FIG. 10 is a schematic diagram of still another example of data transmission method according to an embodiment of this application.
FIG. 11 is a schematic diagram of still another example of data transmission method according to an embodiment of this application.

10. FIG. 10 is a schematic diagram of still another example of a data transmission method according to an embodiment of this application.

S710: A network device #1 sends DCI 1, and UE #1 receives the DCI 1 in a subframe n, where the DCI 1 is used to schedule a transmission resource of uplink data PUSCH 1.

S720: The network device #1 determines a manner in which the UE #1 monitors DCI 2, and sends the DCI 2.

The network device #1 determines a time period n4, the network device #1 schedules, only in the time period n4, a PDCCH corresponding to the DCI 2, and the UE #1 monitors the DCI 2 only in the time period n4. A start moment of the time period n4 is greater than or equal to (not earlier than) an end moment of a subframe p, an end moment of the time period n4 is earlier than or equal to a start moment at which a PUSCH 2 is sent (for example, a start moment of a subframe q in FIG. 10), and duration of the time period n4 may be agreed on in a protocol, or may be configured by the network device by using RRC signaling, or may be preconfigured, or may be calculated by the network device #1 based on duration (or a quantity of repetitions) of uplink data or downlink data. Specific content is similar to the manner of calculating the threshold #1 or the threshold #2 in the method 200. Details are not described herein again. The end moment of the time period n4 is the start moment of the time period n4 plus the duration of the time period n4.

S730: The UE #1 sends the uplink data PUSCH 1 ahead of TA1, and the network device correspondingly receives the uplink data PUSCH 1 in a subframe (n+K1+Koffset1) (for example, a subframe p in FIG. 10); the UE #1 monitors the DCI 2 in the foregoing manner, and receives the DCI 2 in a subframe m; and the UE #1 sends uplink data PUSCH 2 ahead of TA2, and the network device correspondingly receives the uplink data PUSCH 2 in a subframe (m+K2+Koffset2), where a transmission resource of the uplink data PUSCH 2 is scheduled by using the DCI 2.

It should be understood that the time period n4 may alternatively be agreed on in a protocol, and the network device #1 and the UE #1 schedule or monitor DCI in the foregoing manner agreed on in the protocol.

In the scenario shown in FIG. 10, by using the method 700, the network device is enabled to directly specify a time period in which the UE monitors the DCI, so that monitoring duration can be reduced, and power consumption of the UE can be reduced.

Corresponding to the scenario in the method 400, this application further provides a data transmission method 800. The following provides a description with reference to FIG. 11. FIG. 11 is a schematic diagram of still another example of a data transmission method according to an embodiment of this application.

S810: A network device #1 sends DCI 1 and DCI 2, and UE #1 receives the DCI 1 in a subframe n, and receives the DCI 2 in a subframe m. The DCI 1 is used to schedule a transmission resource of uplink data PUSCH 1, and the DCI 2 is used to schedule a transmission resource of uplink data PUSCH 2.

S820: The network device #1 determines a manner in which the UE #1 monitors DCI 3 and DCI 4.

The network device #1 specifies a value of Toffset to determine the manner in which the UE #1 monitors the DCI 3 and the DCI 4. For Toffset, refer to the description of the method 400. Details are not described herein again.

Manner g1

The network device #1 specifies that the value of Toffset is less than or equal to a threshold #6. The network device #1 sends the DCI 3 and the DCI 4 after receiving the PUSCH 2, and the UE #1 starts to monitor the DCI 3 and the DCI 4 after sending the PUSCH 2 and after a round-trip delay. For Toffset, refer to the description of Toffset in the method 400. For a manner of determining the threshold #6, refer to the manner of determining the threshold #1 or the threshold #2 in the method 200. Details are not described herein again.

FIG. 11 is used as an example. The UE #1 starts to monitor the DCI 3 and the DCI 4 after an end moment of an RTT 2. For a description of the RTT 2, refer to the method 400. Details are not described herein again.

Alternatively, the network device #1 may further specify duration t1. After receiving the PUSCH 2, the network device #1 sends the DCI 3 and the DCI 4 after the duration t1, and the UE #1 starts to monitor the DCI 3 and the DCI 4 after the end moment of the RTT 2 plus t1. It should be understood that a unit of the duration t1 may alternatively be another unit such as a slot, a subframe, or a symbol. For a manner of obtaining a value of the duration t1, refer to a manner of obtaining a value of the duration t. Details are not described herein again.

Alternatively, the network device #1 may further specify a specific time domain position for sending the DCI 3 and the DCI 4, and the UE #1 only needs to monitor the DCI 3 and the DCI 4 at the specified time domain position.

Manner g2

Based on the manner g1, the network device #1 may further specify duration t2. The network device #1 sends the DCI 4 after sending the DCI 3 and after t2, and the UE #1 starts to monitor the DCI 4 only after an end moment of a subframe y and after t2. It should be understood that a unit of the duration t2 may alternatively be another unit such as a slot, a subframe, or a symbol. For a manner of obtaining a value of the duration t2, refer to the manner of obtaining the value of the duration t. Details are not described herein again.

S830: The UE #1 sends the uplink data PUSCH 1 ahead of TA1, and the network device correspondingly receives the uplink data PUSCH 1 in a subframe (n+K1+Koffset1) (for example, a subframe p in FIG. 11); the UE #1 sends the uplink data PUSCH 2 ahead of TA2, and the network device correspondingly receives the uplink data PUSCH 2 in a subframe (m+K2+Koffset2); and the network device #1 schedules and sends the DCI 3 and the DCI 4 in one of the foregoing manners as specified, and the UE #1 correspondingly monitors the DCI 3 and the DCI 4, receives the DCI 3 in a subframe y, and receives the DCI 4 in a subframe s.

It should be understood that the foregoing manner may alternatively be agreed on in a protocol, and the UE #1 monitors DCI based on the protocol agreement. Alternatively, the foregoing manner is pre-configured in the network device #1 and the UE #1. The network device #1 determines a manner of monitoring DCI based on the protocol agreement, and notifies the UE #1 of an index. The UE #1 may determine a manner of monitoring the DCI based on the index.

In the scenario shown in FIG. 11, by using the method 800, the network device is enabled to directly specify a time domain position at which the UE monitors DCI, so that monitoring duration can be reduced, and power consumption of the UE can be reduced.

Figure 12:
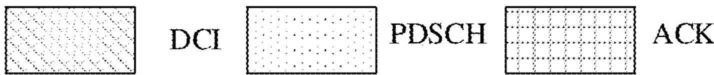
FIG. 12 is a schematic diagram of still another example of data transmission method according to an embodiment of this application.
Figure 12:
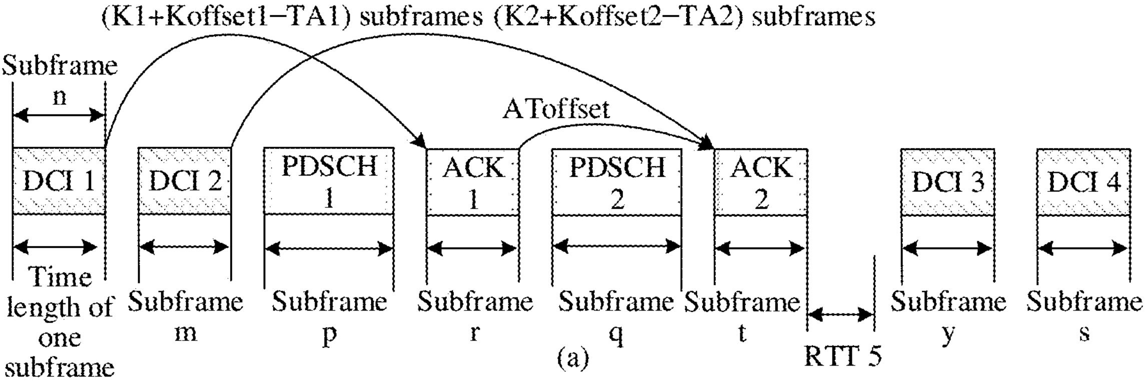
Figure 12:
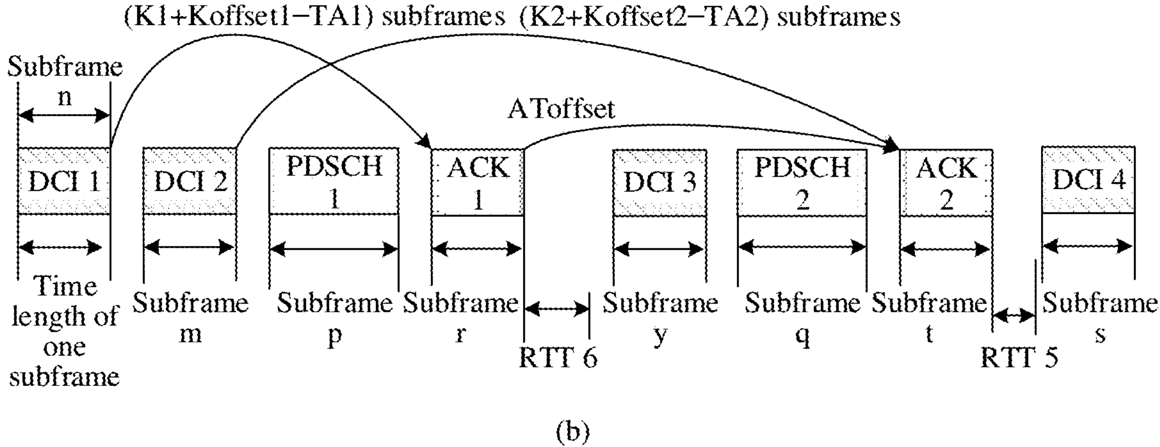

Corresponding to the scenario in the method 500, this application further provides a data transmission method 900. The following provides a description with reference to FIG. 12. FIG. 12 is a schematic diagram of still another example of a data transmission method according to an embodiment of this application.

S910: A network device #1 sends DCI (that is, DCI 1) in a first process and DCI (that is, DCI 2) in a second process, and UE #1 receives the DCI 1 in a subframe n, and receives the DCI 2 in a subframe m. The DCI 1 is used to schedule downlink data PDSCH 1 sent by the network device #1 and a resource of an ACK 1/a NACK 1 sent by the UE #1 for the PDSCH 1, and the DCI 2 is used to schedule downlink data PDSCH 2 sent by the network device #1 and a resource of an ACK 2/a NACK 2 sent by the UE #1 for the PDSCH 2.

S920: The network device #1 determines a manner in which the UE #1 monitors DCI 3 and DCI 4, where the DCI 3 is used by the network device #1 to feed back the ACK 1/the NACK 1, and the DCI 4 is used by the network device #1 to feed back the ACK 2/the NACK 2. The following uses the ACK 1 and the ACK 2 as an example for description. A time at which the UE #1 sends the ACK 1 is earlier than a time at which the UE #1 sends the ACK 2, that is, a time at which the network device #1 receives the ACK 1 is earlier than a time at which the network device receives the ACK 2.

Manner j1

The network device #1 determines a manner of monitoring the DCI 3 and the DCI 4 by specifying a size of a time interval AToffset between the ACK 1 and the ACK 2. For a value of AToffset, refer to the method 200. Details are not described herein again in this application.

The network device #1 specifies that the value of AToffset does not exceed a threshold #7. For a value of the threshold #7, refer to the manner of determining the threshold #1 or the threshold #2 in the method 200. After receiving the ACK 1 and the ACK 2, the network device #1 sends the DCI 3 and the DCI 4. Therefore, after sending the ACK 2 (after an end moment of a subframe t), the UE #1 starts to monitor the DCI 3 and the DCI 4, as shown in (a) in FIG. 12.

Alternatively, the UE #1 starts to monitor the DCI 3 and the DCI 4 after an end moment of an RTT 5 plus duration t3. For the RTT 5, refer to the description of the method 500. A unit of the duration t3 may alternatively be another unit such as a slot, a subframe, or a symbol. For a manner of determining the duration t3, refer to the maximum monitoring duration t in the method 300. Details are not described herein again. The duration t3 is greater than or equal to 0.

For example, when it is specified that t3 is 0, the UE #1 starts to monitor the DCI 3 and the DCI 4 from the end moment of the RTT 5. When it is specified that t3 is greater than 0, the UE #1 starts to monitor the DCI 3 and the DCI 4 after the end moment of the RTT 5 and after t3. The network device #1 schedules, in a corresponding manner, PDCCHs corresponding to the DCI 3 and the DCI 4.

Manner j2

The network device #1 specifies that the DCI 3 corresponding to the ACK 1 is delivered between receiving the ACK 1 and receiving the ACK 2, and the UE #1 starts to monitor the DCI 3 after an end moment of an RTT 6 plus duration t4. For a manner of determining the duration t4, refer to the manner of determining the duration t3. Details are not described herein again. The duration t4 is greater than or equal to 0.

For example, when it is specified that the duration t4 is 0, the UE #1 starts to monitor the DCI 3 from the end moment of the RTT 6. When it is specified that the duration t4 is greater than 0, the UE #1 starts to monitor the DCI 3 after the end moment of the RTT 6 and after t4. If the DCI 3 is received after the end moment of the RTT 6 and after t4 and before a start moment at which the ACK 2 is sent, the UE #1 does not monitor the DCI 4 between an end moment of a subframe y and the end moment of the RTT 5, and the network device #1 schedules, in a corresponding manner, PDCCHs corresponding to the DCI 3 and the DCI 4.

Manner j3

The network device #1 delivers the DCI 4 after an end moment at which the ACK 2 is received plus duration t5. The UE #1 starts to monitor the DCI 4 after an end moment of an RTT 5 plus the duration t5. The duration t5 is greater than or equal to 0. For a manner of obtaining a value of the duration t5, refer to the manner of obtaining the value of the duration t4. Details are not described herein again.

Manner j4

After receiving the ACK 1 and the ACK 2, the network device #1 delivers the DCI 3 and the DCI 4 at a specified time domain position, and enables a time interval between the DCI 3 and the DCI 4 to be DToffset according to a specification, that is, the time interval between an end moment at which the DCI 3 is sent and a start moment at which the DCI 4 is sent is DToffset. The UE #1 monitors the DCI 3 at a corresponding time domain position, and starts to monitor the DCI 4 after an end moment of a subframe y and after DToffset.

For example, the network device #1 delivers the DCI 3 at a specified time tp, and delivers the DCI 4 after DToffset. The UE #1 starts to monitor the DCI 3 after the time tp plus a ½ round-trip delay, and starts to monitor the DCI 4 after an end moment at which the DCI 3 is received (the end moment of the subframe y) and after DToffset.

The manner j1 to the manner j4 may be agreed on in a protocol. The network device #1 schedules, in the manner agreed on in the protocol, PDCCHs respectively corresponding to the DCI 3 and the DCI 4, and the UE #1 monitors DCI in the manner agreed on in the protocol. Details are not described herein in this application. The manner j1 to the manner j4 may alternatively be preconfigured in the UE #1 and the network device #1. The network device #1 notifies, by using RRC signaling, the UE #1 of an index corresponding to a used monitoring manner, and the UE #1 monitors DCI in the monitoring manner indicated by the RRC signaling.

S930: The network device #1 sends the PDSCH 1 and the PDSCH 2, and the UE #1 receives the PDSCH 1 in a subframe p; the UE #1 sends uplink data ACK 1 ahead of TA1, and the network device correspondingly receives the uplink data ACK 1 in a subframe (n+K1+Koffset1) (for example, a subframe r in FIG. 12), and sends the PDSCH 2 in a subframe q; and the UE #1 sends uplink data ACK 2 ahead of TA2, and the network device correspondingly receives the uplink data ACK 2 in a subframe (m+K2+Koffset2) (for example, a subframe t in FIG. 12).

S940: The network device #1 schedules and sends the DCI 3 and the DCI 4 in one of the foregoing manners as specified, and the UE #1 correspondingly monitors the DCI 3 and the DCI 4, receives the DCI 3 in a subframe y, and receives the DCI 4 in a subframe s.

For example, different monitoring manners in the method 600 to the method 900 may be preconfigured in the UE #1. Before scheduling data, the network device #1 may send, to the UE #1, a default monitoring manner for a data scheduling manner used for scheduling data. The UE #1 only needs to monitor a PDCCH in the default monitoring manner. If different services need to be used, the network device #1 may activate another monitoring manner, that is, send an index or a number of a monitoring manner that needs to be used to the UE #1, and the UE #1 monitors a PDCCH in the activated monitoring manner.

In the scenario shown in FIG. 12, by using the method 900, the network device is enabled to directly specify a time domain position at which the UE monitors DCI, so that monitoring duration can be reduced, and power consumption of the UE can be reduced.

Figure 13:
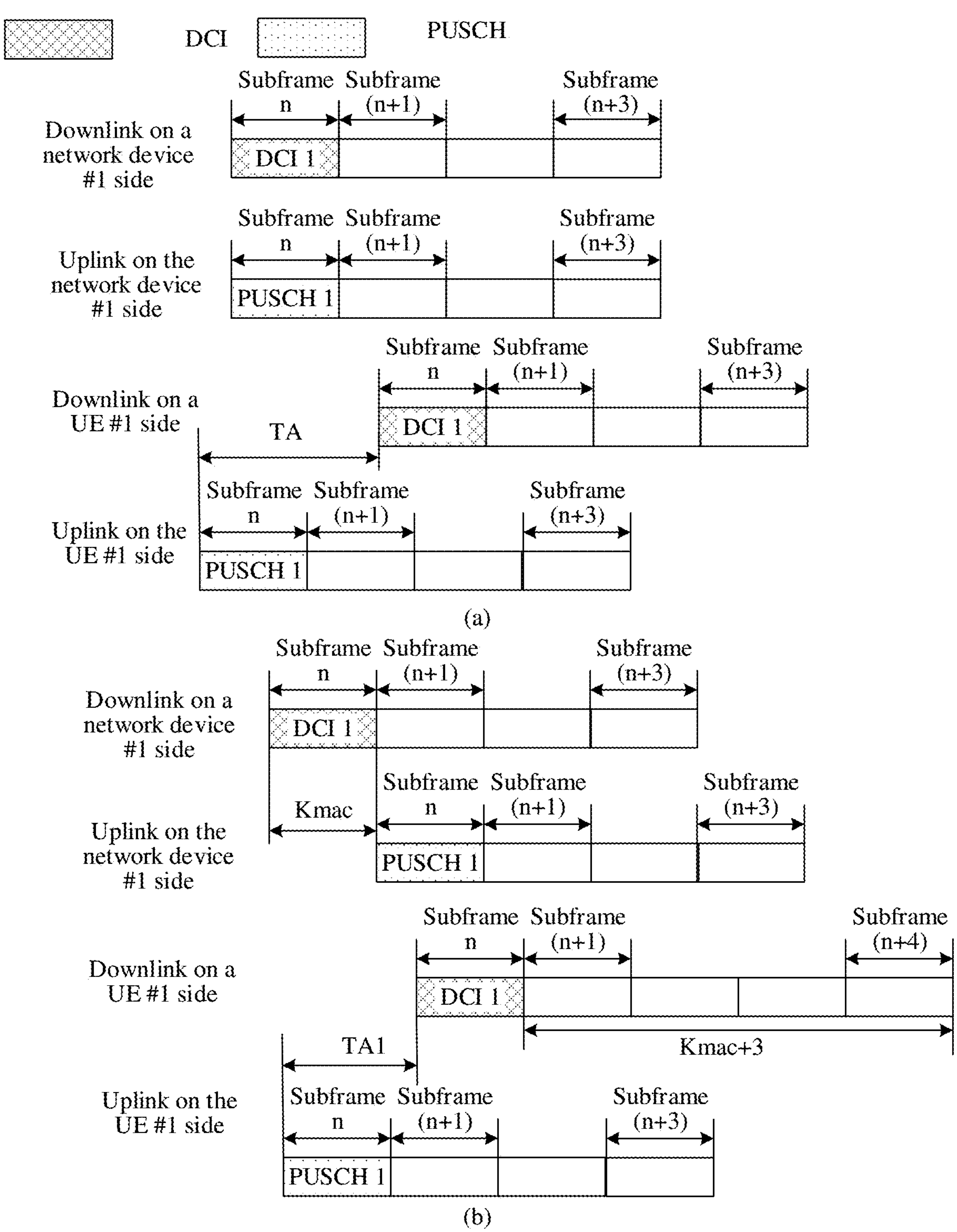
FIG. 13 is a schematic diagram of still another example of data transmission method according to an embodiment of this application.

In this embodiment of this application, a scenario in which a size of a TA affects whether uplink data and downlink data of a network device (for example, a satellite) are aligned is further considered. The following provides a description with reference to FIG. 13. FIG. 13 is a schematic diagram of still another example of a data transmission method according to an embodiment of this application. When the TA is small, for example, is less than or equal to a threshold #8, where for a manner of determining the threshold #8, refer to the manner of determining the threshold #1 or the threshold #2 in the method 200, it may be considered that the uplink data and the downlink data of the network device are aligned, that is, the TA is a round-trip transmission delay from the UE to the network device. It is assumed that the UE ends uplink data transmission in an uplink subframe n, in this case, the UE does not need to monitor a physical downlink control channel in a time period from a start moment of a downlink subframe (n+1) to an end moment of a downlink subframe (n+3), as shown in (a) in FIG. 13. When the TA is large, for example, is greater than the threshold #8, but an amount of timing advance performed by the UE is less than the TA, that is, the timing advance actually performed by the UE is less than a round-trip delay with the network device, the network device needs to additionally perform timing offset Kmac on the uplink data or the downlink data (that is, delay a time of receiving the uplink data or sending the downlink data, and a quantity of offset subframes is Kmac, where a time unit of Kmac may alternatively be a slot, a symbol, a sampling interval, or the like, and then is converted into a quantity of subframes), where Kmac is greater than or equal to 0, and the UE monitors a PDCCH by using a method 1000. The following describes the method 1000 with reference to FIG. 13.

S1010: UE #1 receives DCI 1 in a downlink subframe n, and the UE #1 sends a PUSCH 1 ahead of TA1.

S1020: The UE #1 determines a monitoring manner.

The UE #1 determines the monitoring manner based on a relationship between the TA1 and a threshold #8, and monitors a physical downlink control channel in one of the following manners.

Manner y

When the TA1 is less than or equal to the threshold #8, the TA1 is equal to a round-trip delay between the UE #1 and the network device #1, the UE #1 does not monitor the PDCCH in a time period from a start moment of a downlink subframe (n+1) to an end moment of a downlink subframe (n+3), the network device #1 does not schedule the PDCCH in the time period, and the UE #1 starts to monitor the PDCCH from the end moment of the downlink subframe (n+3).

Manner z

When the TA1 is greater than the threshold #8 and is less than the round-trip delay between the UE #1 and the network device #1, the UE #1 does not monitor the PDCCH in a time period from the start moment of the downlink subframe (n+1) to an end moment of a downlink subframe (n+3+Kmac), the network device #1 does not schedule the PDCCH in the time period, and the UE #1 starts to monitor the PDCCH from the end moment of the downlink subframe (n+3+Kmac).

S1030: A network device #1 receives the PUSCH 1 after Kmac subframes are offset.

In the scenario shown in FIG. 13, by using the method 1000, the UE is enabled to determine, based on a size of the timing advance, a time domain position at which the physical downlink control channel is monitored, so that monitoring duration can be reduced, and power consumption of the UE can be reduced.

It should be noted that the PDCCH, the PDSCH, and the PUSCH in this application may be directly used in the LTE and 5G systems, and may be further applied to an NB-IoT (narrowband IoT) system. In this case, the PDCCH, the PDSCH, and the PUSCH respectively correspond to an NPDCCH, an NPDSCH, and an NPUSCH.

Figure 14:
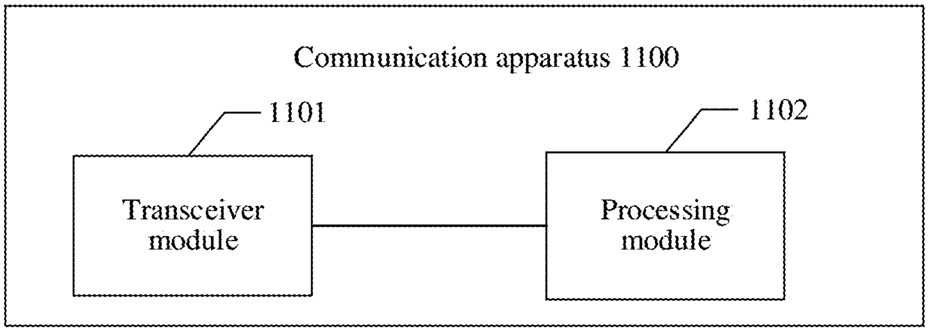
FIG. 14 is a schematic diagram of a structure of a possible communication apparatus according to an embodiment of this application.
Figure 15:
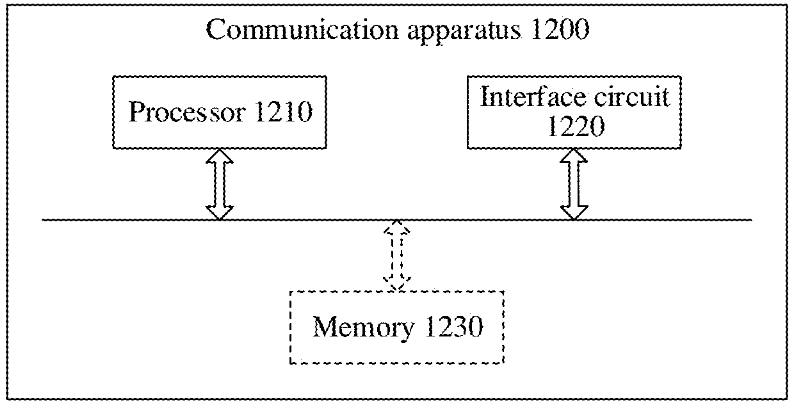
FIG. 15 is a schematic diagram of a structure of a possible communication apparatus according to an embodiment of this application.

FIG. 14 and FIG. 15 are schematic diagrams of structures of possible communication apparatuses according to embodiments of this application. The communication apparatuses may implement the functions of the terminal device or the network device in the foregoing method embodiments. Therefore, beneficial effects of the foregoing method embodiments can also be implemented. In this embodiment of this application, the communication apparatus may be the first communication apparatus in the method 100, or may be the second communication apparatus in the method 100, or may be a module (for example, a chip) used in the first communication apparatus or the second communication apparatus.

As shown in FIG. 14, a communication apparatus 1100 includes a transceiver module 1101 and a processing module 1102. The communication apparatus 1100 may be configured to implement the functions of the first communication apparatus or the second communication apparatus in the method embodiment shown in FIG. 3.

When the communication apparatus 1100 is configured to implement the function of the first communication apparatus in the method embodiment in FIG. 3, the transceiver module 1101 is configured to receive a first physical downlink control channel PDCCH, where the first PDCCH includes first downlink control information DCI, the first DCI indicates a first resource, and the first resource is used to carry first uplink data; the processing module 1102 is configured to determine a first time period or a second time period, where the first time period includes a time period for monitoring a second PDCCH, and the second time period does not include the second PDCCH; and the processing module 1102 is further configured to monitor the second PDCCH based on the first time period or the second time period.

When the communication apparatus 1100 is configured to implement the function of the second communication apparatus in the method embodiment in FIG. 3, the transceiver module 1101 is configured to send a first physical downlink control channel PDCCH, where the first PDCCH includes first downlink control information DCI, the first DCI indicates a first resource, and the first resource is used to carry first uplink data; the processing module 1102 is configured to determine a first time period or a second time period, where the first time period includes a time period for sending a second PDCCH, and the second time period does not include the second PDCCH; and the processing module 1102 is further configured to send the second PDCCH based on the first time period or the second time period.

For more detailed descriptions of the transceiver module 1101 and the processing module 1102, refer to related descriptions in the foregoing method embodiments. Details are not described herein again.

As shown in FIG. 15, a communication apparatus 1200 includes a processor 1210 and an interface circuit 1220. The processor 1210 and the interface circuit 1220 are coupled to each other. It may be understood that the interface circuit 1220 may be a transceiver or an input/output interface.

Optionally, the communication apparatus 1200 may further include a memory 1230, configured to store instructions executed by the processor 1210, or store input data required by the processor 1210 to run the instructions, or store data generated after the processor 1210 runs the instructions.

For example, the memory 1230 and the processor 1210 may be integrated together, or may be independent components.

When the communication apparatus 1200 is configured to implement the method in the foregoing method embodiments, the processor 1210 may be configured to perform the function of the processing module 1102, and the interface circuit 1220 may be configured to perform the function of the transceiver module 1101.

When the communication apparatus is a chip used in the first communication apparatus (for example, the terminal device), the chip in the first communication apparatus implements the function of the first communication apparatus in the foregoing method embodiments. The chip in the first communication apparatus receives information from another module (for example, a radio frequency module or an antenna) in the first communication apparatus, where the information is sent by the second communication apparatus (for example, the network device) to the first communication apparatus; or the chip in the first communication apparatus sends information to another module (for example, a radio frequency module or an antenna) in the first communication apparatus, where the information is sent by the first communication apparatus to the second communication apparatus.

When the communication apparatus is a chip used in the second communication apparatus (for example, the network device), the chip in the second communication apparatus implements the function of the second communication apparatus in the foregoing method embodiments. The chip in the second communication apparatus receives information from another module (for example, a radio frequency module or an antenna) in the second communication apparatus, where the information is sent by the first communication apparatus to the second communication apparatus; or the chip in the second communication apparatus sends information to another module (for example, a radio frequency module or an antenna) in the second communication apparatus, where the information is sent by the second communication apparatus to the first communication apparatus.

It may be understood that, the processor in embodiments of this application may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general purpose processor may be a microprocessor or any regular processor or the like.

The method steps in embodiments of this application may be implemented in a hardware manner, or may be implemented in a manner of executing software instructions by the processor. The software instructions may include a corresponding software module. The software module may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in an access network device or a terminal device. Certainly, the processor and the storage medium may exist in the access network device or the terminal device as discrete components.

All or some of the foregoing embodiments may be implemented by using software, hardware, firmware, or any combination thereof. When software is used to implement embodiments, all or a part of embodiments may be implemented in a form of a computer program product. The computer program product includes one or more computer programs and instructions. When the computer programs or instructions are loaded and executed on a computer, all or some of the procedures or functions in embodiments of this application are executed. The computer may be a general-purpose computer, a dedicated computer, a computer network, or other programmable apparatuses. The computer programs or the instructions may be stored in a computer-readable storage medium, or may be transmitted through the computer-readable storage medium. The computer-readable storage medium may be any usable medium accessible by a computer, or a data storage device such as a server integrating one or more usable media. The usable medium may be a magnetic medium, for example, a floppy disk, a hard disk drive, or a magnetic tape; or may be an optical medium, for example, a DVD; or may be a semiconductor medium, for example, a solid-state drive (SSD).

In embodiments of this application, unless otherwise stated or there is a logic conflict, terms and/or descriptions between different embodiments are consistent and may be mutually referenced, and technical features in different embodiments may be combined into a new embodiment based on an internal logical relationship thereof.

In this application, at least one means one or more, and a plurality of means two or more. The term "and/or" describes an association relationship between associated objects, and represents that three relationships may exist. For example, A and/or B may represent the following cases: Only A exists, both A and B exist, and only B exists, where A and B may be singular or plural. In the text descriptions of this application, the character "/" generally indicates an "or" relationship between the associated objects. In a formula in this application, the character "/" indicates a "division" relationship between the associated objects.

It may be understood that various numbers in embodiments of this application are merely used for differentiation for ease of description, and are not used to limit the scope of embodiments of this application. The sequence numbers of the foregoing processes do not mean execution sequences, and the execution sequences of the processes should be determined based on functions and internal logic of the processes. It should be noted that not all steps in embodiments of this application need to be performed, and some steps may be omitted, and a similar effect can also be achieved.

What is claimed is:

1. A method, comprising:

receiving a first physical downlink control channel (PDCCH), wherein the first PDCCH comprises first downlink control information (DCI), the first DCI indicates a first resource, and the first resource is used to carry first uplink data;

determining a first time period or a second time period, wherein the first time period comprises a time period for monitoring a second PDCCH so that a terminal device is able to monitor the second PDCCH in the first time period, and the second time period does not comprise the second PDCCH so that the terminal device is able to skip monitoring the second PDCCH in the second time period; and monitoring the second PDCCH based on the first time period or the second time period;

wherein the second PDCCH comprises a second DCI, the second DCI indicates a second resource, and the second resource is used to carry second uplink data;

wherein determining the first time period or the second time period comprises:

determining the first time period or the second time period based on a size of a first time interval, wherein the first time interval comprises a time interval between an end moment at which the first PDCCH is received and a start moment corresponding to the first resource; and wherein determining the first time period or the second time period based on the size of the first time interval comprises:

determining the first time period or the second time period based on at least one of a first size relationship, a second size relationship, or both the first size relationship and the second size relationship, wherein the first size relationship is between the size of the first time interval and a first threshold, the second size relationship is between the size of the first time interval and a second threshold, and the second threshold is greater than the first threshold.

2. The method according to claim 1, wherein determining the first time period or the second time period based on at least one of the first size relationship, the second size relationship, or both the first size relationship and the second size relationship, comprises:

when the first time interval is less than or equal to the first threshold, determining that the second time period comprises a time period from the end moment of the first PDCCH to the start moment corresponding to the first resource.

3. The method according to claim 1, wherein determining the first time period or the second time period based on at least one of the first size relationship, the second size relationship, or both the first size relationship and the second size relationship, comprises:

when the first time interval is greater than the first threshold and less than or equal to the second threshold, determining that the first time period comprises a time period from the end moment of the first PDCCH to a start moment of a previous transmission time unit of the start moment corresponding to the first resource.

4. The method according to claim 1, wherein determining the first time period or the second time period based on at least one of the first size relationship, the second size relationship, or both the first size relationship and the second size relationship, comprises:

when the first time interval is greater than the second threshold, determining that the first time period comprises a time period from the end moment of the first PDCCH to a start moment of a previous transmission time unit that is earlier than the start moment corresponding to the first resource.

5. The method according to claim 4, further comprising:

when the second DCI is received in the first time period, determining that the second time period comprises a time period from an end moment of the second PDCCH to the start moment corresponding to the first resource.

6. The method according to claim 1, wherein determining the first time period or the second time period based on at least one of the first size relationship, the second size relationship, or both the first size relationship and the second size relationship, comprises:

when the first time interval is greater than the second threshold, determining that the second time period comprises a time period from the end moment of the first PDCCH to a start moment of a previous transmission time unit that is earlier than the start moment corresponding to the first resource, and the first time period comprises a time period from an end moment of the second time period to the start moment of the previous transmission time unit of the start moment corresponding to the first resource.

7. The method according to claim 1, wherein the first time period comprises a time period from a moment that is later than or equal to an end moment corresponding to the first resource to a moment that is delayed by a first time amount from the end moment corresponding to the first resource, and the first time amount is greater than or equal to 0.

8. The method according to claim 7, wherein the second time period comprises a time period from an end moment of the first time period to a moment that is a first delay later than the end moment corresponding to the first resource, and the first delay is a round-trip delay between a first communication apparatus and a second communication apparatus.

9. The method according to claim 1, wherein the second time period comprises a time period from a moment that is later than or equal to an end moment corresponding to the first resource to a moment that is delayed by a second time amount from the end moment corresponding to the first resource, and the second time amount is greater than or equal to 0.

10. The method according to claim 9, wherein the first time period comprises a time period from an end moment of the second time period to a moment that is a first delay later than the end moment corresponding to the first resource, and the first delay is a round-trip delay between a first communication apparatus and a second communication apparatus.

11. A method, comprising:

sending a first physical downlink control channel (PDCCH), wherein the first PDCCH comprises first downlink control information (DCI), the first DCI indicates a first resource, and the first resource is used to carry first uplink data;

determining a first time period or a second time period, wherein the first time period comprises a time period for sending a second PDCCH, and the second time period does not comprise the second PDCCH; and sending the second PDCCH based on the first time period or the second time period;

wherein the second PDCCH comprises a second DCI, the second DCI indicates a second resource, and the second resource is used to carry second uplink data;

wherein determining the first time period or the second time period comprises:

determining the first time period or the second time period based on a size of a first time interval, wherein the first time interval comprises a time interval between an end moment of the first PDCCH and a start moment corresponding to the first resource; and wherein determining the first time period or the second time period based on the size of the first time interval comprises:

determining the first time period or the second time period based on at least one of a first size relationship, a second size relationship, or both the first size relationship and the second size relationship, wherein the first size relationship is between the size of the first time interval and a first threshold, the second size relationship is between the size of the first time interval and a second threshold, and the second threshold is greater than the first threshold.

12. The method according to claim 11, wherein determining the first time period or the second time period based on at least one of the first size relationship, the second size relationship, or both the first size relationship and the second size relationship, comprises:

when the first time interval is less than or equal to the first threshold, determining that the second time period comprises a time period from the end moment of the first PDCCH to the start moment corresponding to the first resource.

13. The method according to claim 11, wherein determining the first time period or the second time period based on at least one of the first size relationship, the second size relationship, or both the first size relationship and the second size relationship, comprises:

when the first time interval is greater than the first threshold and less than or equal to the second threshold, determining that the first time period comprises a time period from the end moment of the first PDCCH to a start moment of a previous transmission time unit of the start moment corresponding to the first resource.

14. The method according to claim 11, wherein determining the first time period or the second time period based on at least one of the first size relationship, the second size relationship, or both the first size relationship and the second size relationship, comprises:

when the first time interval is greater than the second threshold, determining that the first time period comprises a time period from the end moment of the first PDCCH to a start moment of a previous transmission time unit that is earlier than the start moment corresponding to the first resource.

15. The method according to claim 14, further comprising:

when the second DCI is received in the first time period, determining that the second time period comprises a time period from an end moment of the second PDCCH to the start moment corresponding to the first resource.

16. A communication apparatus, comprising:

at least one memory and at least one processor, wherein the at least one memory stores a computer program or instructions, and when the at least one processor is executing the computer program or instructions, the communication apparatus is enabled to:

receive a first downlink control channel (PDCCH), wherein the first PDCCH comprises first downlink control information (DCI), the first DCI indicates a first resource, and the first resource is used to carry first uplink data;

determine a first time period or a second time period, wherein the first time period comprises a time period for monitoring a second PDCCH, and the second time period does not comprise the second PDCCH; and monitor the second PDCCH based on the first time period or the second time period;

wherein the second PDCCH comprises a second DCI, the second DCI indicates a second resource, and the second resource is used to carry second uplink data;

wherein determining the first time period or the second time period comprises:

determining the first time period or the second time period based on a size of a first time interval, wherein the first time interval comprises a time interval between an end moment at which the first PDCCH is received and a start moment corresponding to the first resource; and wherein determining the first time period or the second time period based on the size of the first time interval comprises:

determining the first time period or the second time period based on at least one of a first size relationship, a second size relationship, or both the first size relationship and the second size relationship, wherein the first size relationship is between the size of the first time interval and a first threshold, the second size relationship is between the size of the first time interval and a second threshold, and the second threshold is greater than the first threshold.

17. The communication apparatus according to claim 16, wherein determining the first time period or the second time period based on at least one of the first size relationship, the second size relationship, or both the first size relationship and the second size relationship, comprises:

when the first time interval is less than or equal to the first threshold, determining that the second time period comprises a time period from the end moment of the first PDCCH to the start moment corresponding to the first resource.

18. The communication apparatus according to claim 16, wherein determining the first time period or the second time period based on at least one of the first size relationship, the second size relationship, or both the first size relationship and the second size relationship, comprises:

when the first time interval is greater than the first threshold and less than or equal to the second threshold, determining that the first time period comprises a time period from the end moment of the first PDCCH to a start moment of a previous transmission time unit of the start moment corresponding to the first resource.

19. The communication apparatus according to claim 16, wherein determining the first time period or the second time period based on at least one of the first size relationship, the second size relationship, or both the first size relationship and the second size relationship, comprises:

when the first time interval is greater than the second threshold, determining that the first time period comprises a time period from the end moment of the first PDCCH to a start moment of a previous transmission time unit that is earlier than the start moment corresponding to the first resource.

20. The communication apparatus according to claim 16, wherein the communication apparatus is further enabled to:

when the second DCI is received in the first time period, determine that the second time period comprises a time period from an end moment of the second PDCCH to the start moment corresponding to the first resource.

* * * * *